(12) United States Patent
Hasegawa

(10) Patent No.: US 6,920,803 B2
(45) Date of Patent: Jul. 26, 2005

(54) ELECTROMOTIVE STAGE FOR MICROSCOPE

(75) Inventor: Kazuhiro Hasegawa, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 109 days.

(21) Appl. No.: 10/201,370

(22) Filed: Jul. 23, 2002

(65) Prior Publication Data

US 2003/0019310 A1 Jan. 30, 2003

(30) Foreign Application Priority Data

Jul. 25, 2001 (JP) ........................................ 2001-224076

(51) Int. Cl.$^7$ ............................................. G02B 21/26
(52) U.S. Cl. ..................... 74/89.22; 74/89.2; 74/409; 359/391
(58) Field of Search ................... 74/409, 89.22, 74/89.12, 89.16, 89.2, 490.01, 490.09; 414/749.3, 661, 664, 674; 318/590, 592, 593; 359/391, 393

(56) References Cited

U.S. PATENT DOCUMENTS

| | | | | |
|---|---|---|---|---|
| 2,556,374 A | * | 6/1951 | Koechel ................... 235/61 A |
| 3,828,641 A | * | 8/1974 | Sitte ............................ 83/703 |
| 3,892,324 A | * | 7/1975 | Faletti, Jr. .................... 414/662 |
| 4,445,758 A | * | 5/1984 | Emmel ........................ 359/392 |
| 4,711,537 A | * | 12/1987 | Schindl et al. .............. 359/393 |
| 4,832,474 A | * | 5/1989 | Yoshinaga et al. .......... 359/392 |
| 4,938,087 A | * | 7/1990 | Ragard ...................... 74/89.21 |
| 5,125,790 A | * | 6/1992 | Foulke et al. ............. 414/752.1 |
| 5,260,825 A | * | 11/1993 | Nagano et al. ............. 359/368 |
| 5,497,060 A | * | 3/1996 | Juergens, III ................ 700/60 |
| 5,641,264 A | * | 6/1997 | Kuno et al. ............... 198/464.2 |
| 5,802,925 A | * | 9/1998 | Kanao ...................... 74/490.13 |
| 6,018,415 A | * | 1/2000 | Woo et al. .................. 359/393 |
| 6,049,420 A | * | 4/2000 | Kraft .......................... 359/393 |
| 6,057,662 A | * | 5/2000 | McAndrew et al. ........ 318/567 |
| 6,151,122 A | * | 11/2000 | Taniguchi et al. .......... 356/399 |
| 6,281,655 B1 | * | 8/2001 | Poon et al. ................. 318/649 |

FOREIGN PATENT DOCUMENTS

| | | |
|---|---|---|
| JP | 59-53319 U | 4/1984 |
| JP | 61-68219 U | 5/1986 |
| JP | 01219814 * | 9/1989 |
| JP | 4-22251 Y2 | 5/1992 |
| JP | 2000-214390 A | 8/2000 |

* cited by examiner

*Primary Examiner*—William C. Joyce
(74) *Attorney, Agent, or Firm*—Frishauf, Holtz, Goodman & Chick, P.C.

(57) ABSTRACT

A stationary member is fixed to a microscope. A movable member holds a sample and can move in a direction perpendicular to an optical axis of the microscope. A stepping motor moves the movable member. A rotation of the stepping motor is transmitted to the movable member by a power transmitter. An origin detector detects the movable member being positioned in an origin. A control unit controls the position of the movable member based on a signal from the origin detector and the number of driving pulses of the stepping motor. A power transmitter includes a reducer having a spur gear which reduces a speed of the rotation of the stepping motor, and an urging unit which applies a rotation force to the spur gear in one direction in a movement range of the movable member.

2 Claims, 18 Drawing Sheets

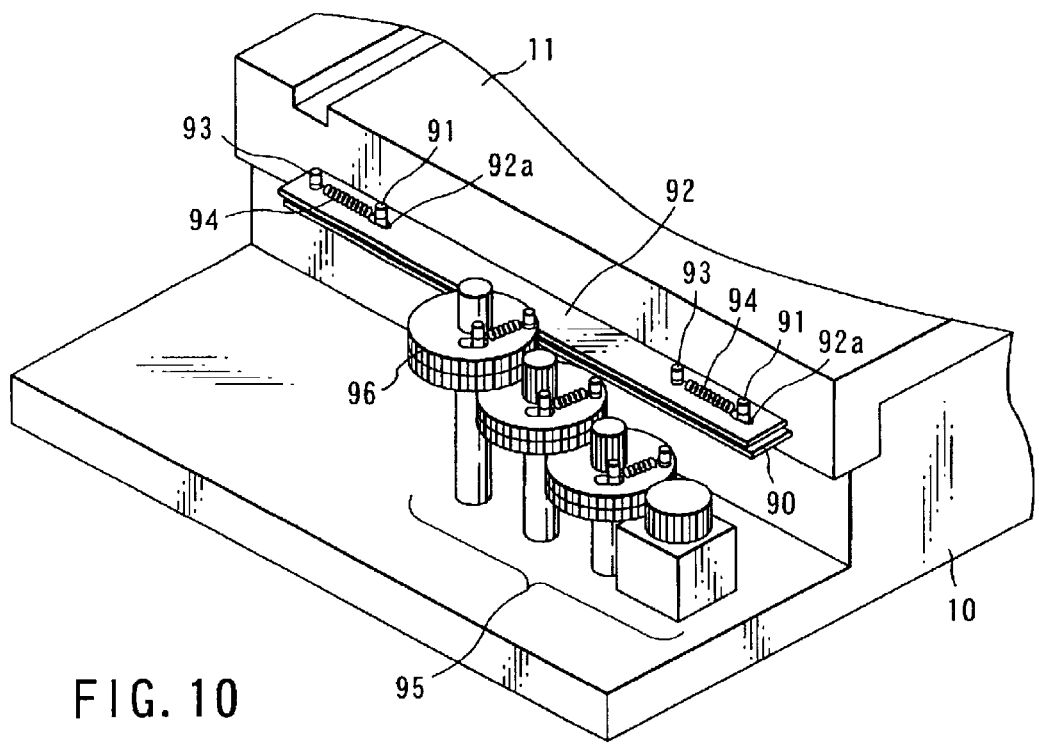
FIG. 10
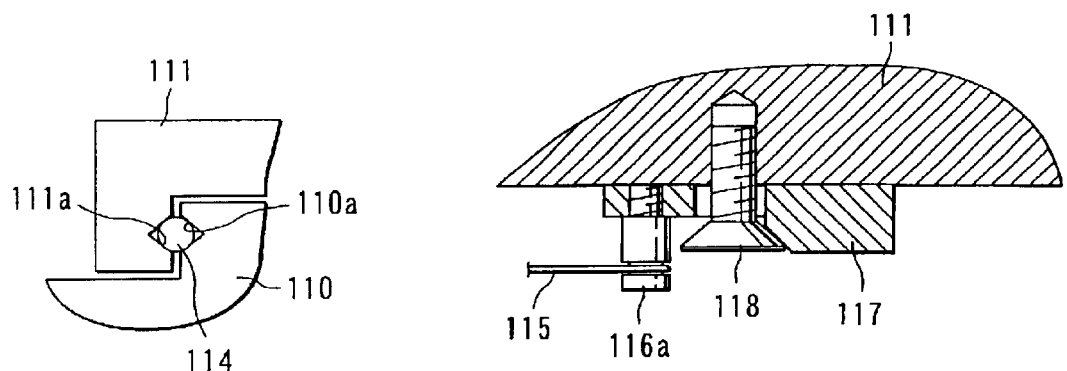
FIG. 12
FIG. 13
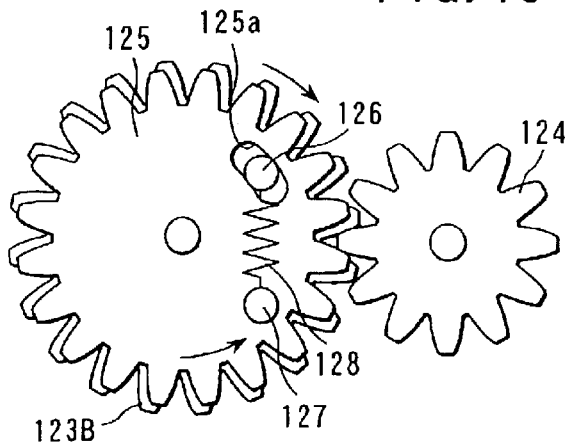
FIG. 14

ELECTROMOTIVE STAGE FOR MICROSCOPE

CROSS-REFERENCE TO RELATED APPLICATIONS

This application is based upon and claims the benefit of priority from the prior Japanese Patent Application No. 2001-224076, filed Jul. 25, 2001, the entire contents of which are incorporated herein by reference.

BACKGROUND OF THE INVENTION

1. Field of the Invention

The present invention relates to an electromotive stage for a microscope, disposed in an optical microscope, for electrically moving an observation object in two dimensions.

2. Description of the Related Art

For a conventional electromotive stage, a technique (first conventional example) is disclosed as a "microscope with an automatic sweeping apparatus" in Jpn. UM Appln. KOKAI Publication No. 59-53319. The first conventional example will be described with reference to FIGS. 27 and 28. In FIG. 27, an X-axis movement mechanism 501 and Y-axis movement mechanism 502 are disposed on a stationary stage 511 of the electromotive stage, so that a sample 512 can two-dimensionally be scanned with respect to an optical axis of a microscope. The X-axis movement mechanism 501 and Y-axis movement mechanism 502 are constituted of a movable base 503, a kremmel 504, ball screws 505, 506, and flexible cables 507, 508 shown in FIG. 28, and stepping motors 509, 510 shown in FIG. 27. Since the ball screws 505, 506 and flexible cables 507, 508 can transmit a rotary motion without any jounce, rotation angles of the stepping motors 509, 510 are accurately transformed into a linear motion of the movable base 503 or the kremmel 504. This constitution can realize a high precision stage without any lost motion.

Similarly, a technique (second conventional example) is disclosed as the "microscope with the automatic sweeping apparatus" in Jpn. UM Appln. KOKAI Publication No. 61-68219. Since the constitution of the microscope is substantially similar to that of the first conventional example, the description thereof is omitted. A mechanical power from a motor is transmitted to a rack disposed in the kremmel via a train of gears including a clutch. When the clutch is controlled, manual and electromotive operations can easily be switched, and an operationality of an electromotive microscope is enhanced. The mechanical power is transmitted using the train of gears, not the ball screws.

Moreover, a technique (third conventional example) is disclosed as a "stage for the microscope" in Jpn. Pat. Appln. KOKAI Publication No. 2000-214390. The third conventional example will be described with reference to FIGS. 29 and 30. In FIGS. 29 and 30, the stage has two members moved with respect to each other, such as a stationary base 601 and a movable base 602. In the one member a wire rope 604 is extended. In the other member a pulley 603 is disposed on a driving handle shaft. An urging member 605 applies a tensile force to the wire rope 604. Therefore, unless an abnormal operation, such as an operation of adding the overload higher than the frictional force between the pulley 603 and wire rope 604, is performed, the mechanical power is transmitted without any slip.

Furthermore, a technique (fourth conventional example) is disclosed as a "micro dimension positioning apparatus" in Jpn. UM Appln. KOKOKU Publication No. 4-22251. In the fourth conventional example, a photo interrupter sensor is used as a sensor for detecting an origin. The photo interrupter sensor has light emitting element and light receiving element which are disposed U-shaped housing. The elements are located in two opposed arms of the housing, respectively. An interrupting member inserted between the opposed arms interrupts light to the light receiving element from the light emitting element, and then an output signal is obtained. The photo interrupter sensor is inexpensively available. Here, a sensor optical axis refers to an optical axis connecting the light emitting element and the light receiving element. A position of the interrupting member to the sensor optical axis, where the interrupting member interrupts the light, is obtained, is not constant. A dispersion of the position is several tens of micrometers. That is, a precision with which the position of the member is detected is several tens of micrometers.

In general, an origin detection precision of about several micrometers is required in the electromotive stage for the microscope. Therefore, as long as the photo interrupter sensor directly detects the movement of the movable member, the required origin detection precision cannot be obtained. In the fourth conventional example, a micrometer for accurately transforming the rotary motion of a screw to a linear motion of a nut is used as a transmission means for transmitting the rotation of the motor to the movable member. Then, the photo interrupter sensor detects the rotation direction of the micrometer, and the movable member is positioned based on the signal of the sensor. Thereby, the origin detection precision of about several micrometers is realized.

In the second conventional example, the ball screw is not used, and a rack & pinion is used. Therefore, by a backlash of the gear, a moving distance differs in a case of moving in the same direction as the previous direction, and a case of moving in an opposite direction. That is, a lost motion is generated. Therefore, a high precision electromotive stage cannot be realized.

In the third conventional example, the wire rope is used. The wire rope is not applied to the electromotive stage.

In the fourth conventional example, a tensile spring is used to connect the micrometer to the movable member without any gap. Reduction of a change of an acting force of the spring in a movement range of 50 mm or more, necessary for the microscope, is incompatible with reduction of a space occupied by the tensile spring, and it is impossible to realize both reductions. Moreover, if the origin detector of the fourth conventional example is applied to the power transmission mechanism with the wire rope, a sensor detecting the position of the movable member in the moving direction and a sensor detecting the rotation position of the stepping motor in the rotation direction are required. However, since a slip is generated between the wire rope and the pulley, the rotation position of the output shaft of the stepping motor in the rotation direction dose not always synchronize with the position of the movable member to a stationary member. In the fourth conventional example, a method of setting the origin in the electromotive stage using the wire rope with high precision is not proposed.

BRIEF SUMMARY OF THE INVENTION

An electromotive stage for a microscope comprises a stationary member configured to be fixed to the microscope, a movable member which holds a sample and is movable in a direction perpendicular to an optical axis of the microscope, a stepping motor which moves the movable member, a power transmitter which transmits a rotation of the stepping motor to the movable member, an origin detector which detects the movable member being positioned in an origin, a control unit which controls a position of the movable member based on a signal from the origin detector and the number of driving pulses of the stepping motor, a reducer which reduces a speed of the rotation of the stepping motor and includes at least one spur gear, and an urging unit which applies a rotation force to the spur gear in one direction in a movement range of the movable member. The power transmitter includes the reducer and the urging unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 10 is a perspective view of an electromotive stage according to a fifth embodiment;

FIG. 12 is an enlarged side view of a guide between a stationary member and a movable member of the stage according to the sixth embodiment;

FIG. 13 is an enlarged sectional view of a tensile force adjuster of a wire rope of the stage according to the sixth embodiment;

FIG. 14 is an explanatory view of a backlash removing means of the stage according to the sixth embodiment;

DETAILED DESCRIPTION OF THE INVENTION

Figure 1:
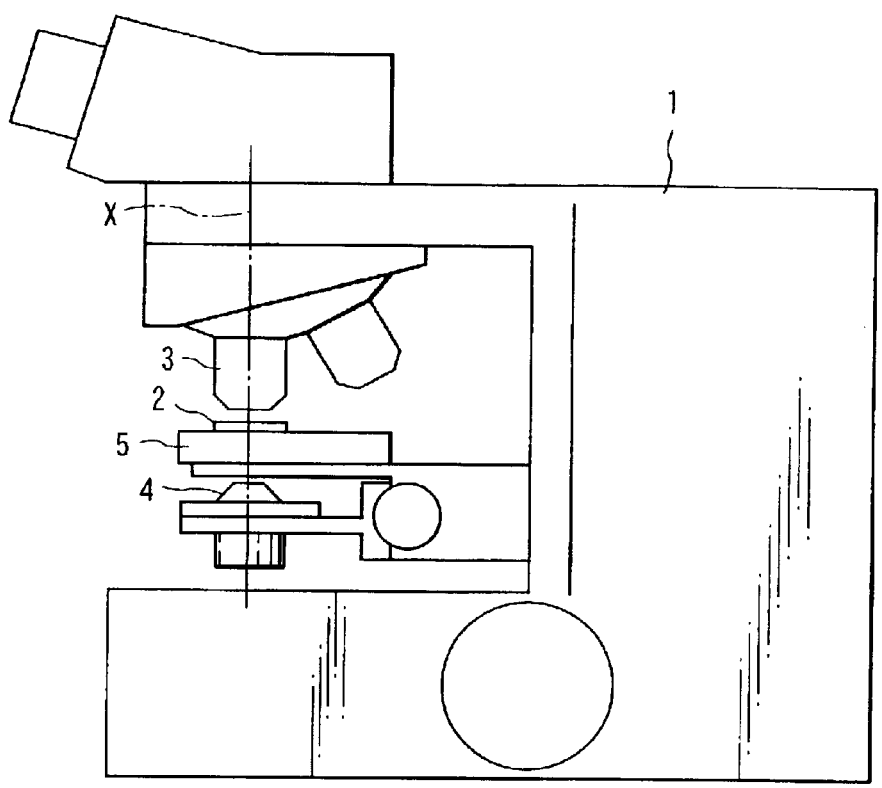
FIG. 1 is an explanatory view showing a relation between a microscope and an electromotive stage for the microscope.

Prior to description of embodiments of an electromotive stage for a microscope, a relation between the microscope and the electromotive stage for the microscope will first be described. FIG. 1 is an explanatory view of the relation between the microscope and the electromotive stage for the microscope. On an optical axis X of a microscope 1, an objective lens 3 enlarging and observing a sample 2, and a condenser 4 irradiating the sample 2 with a sufficient light are disposed in predetermined positions in an adjustable manner. The sample 2 as an observation object laid on an electromotive stage 5 positioned between the objective lens 3 and the condenser 4. An upper surface of the stage 5 is requested to have a flat shape for an attaching operation of the sample. On the other hand, a lower portion of the stage is requested to occupy little space in the lower portion of the microscope, that is, to have a small dimension in order to keep away from operation portions, such as a focus knob in the lower portion of the microscope.

(First Embodiment)

Figure 3:
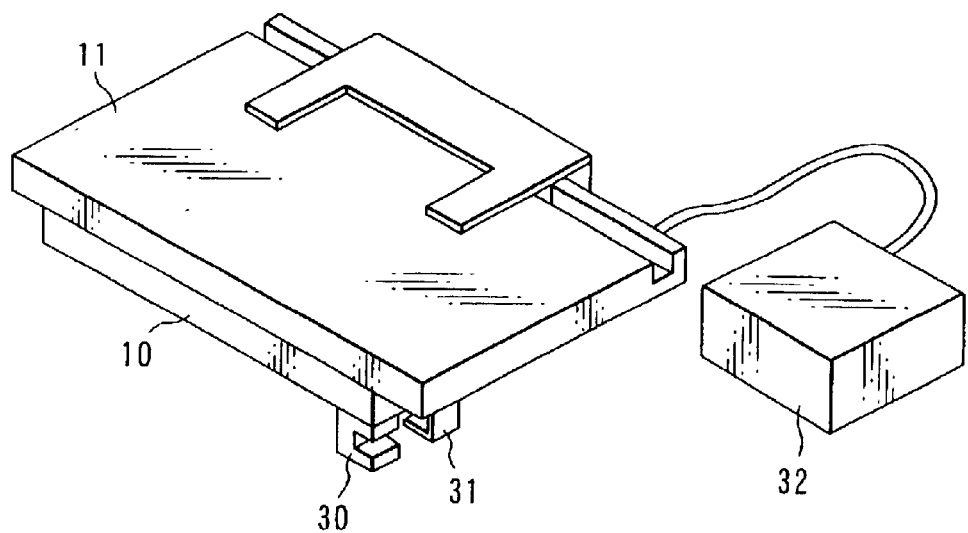
FIG. 3 is a perspective view of a control unit managing a position of the stage according to the first embodiment.
Figure 2:
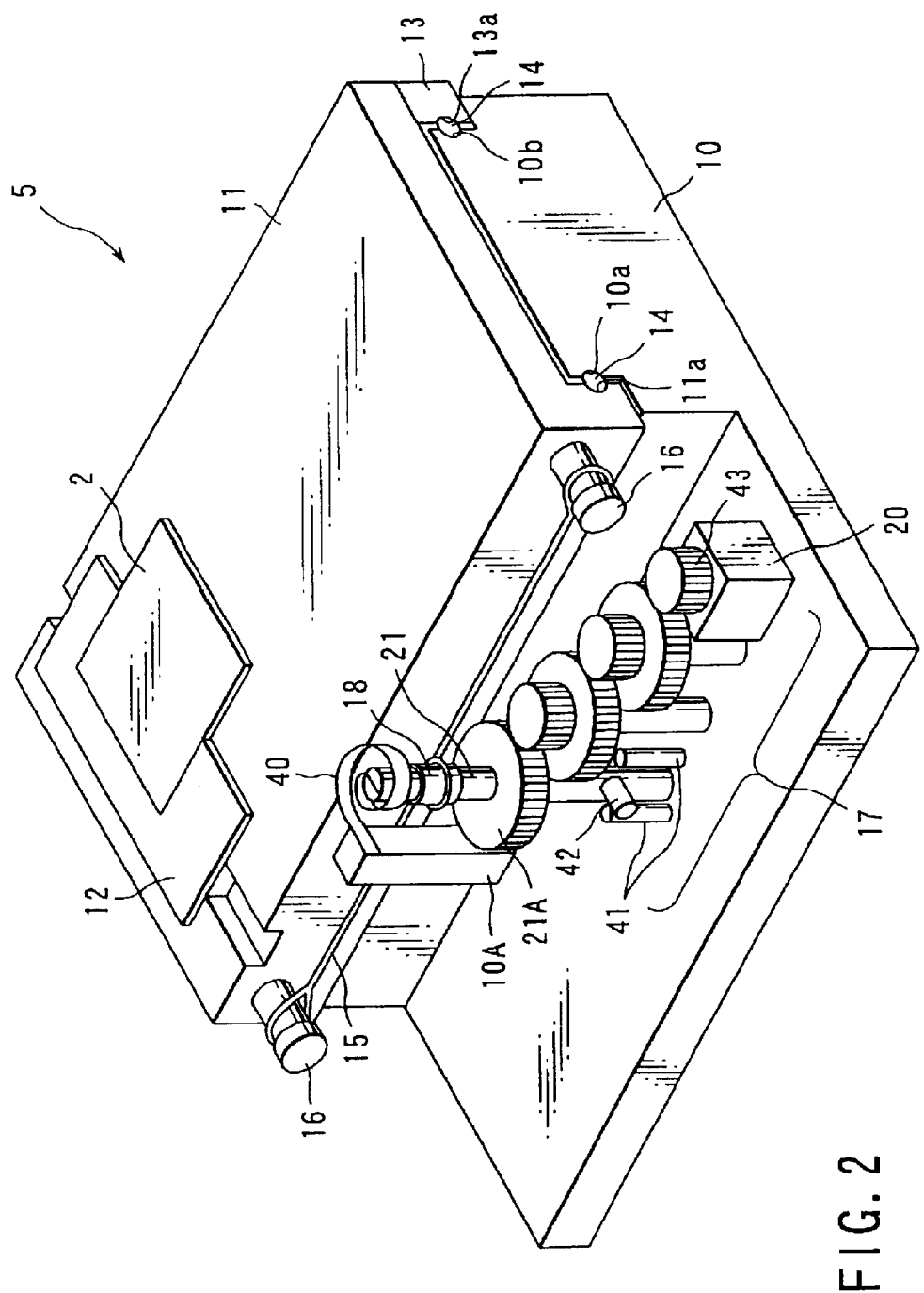
FIG. 2 is a perspective view of an electromotive stage for the microscope according to a first embodiment.
Figure 4:
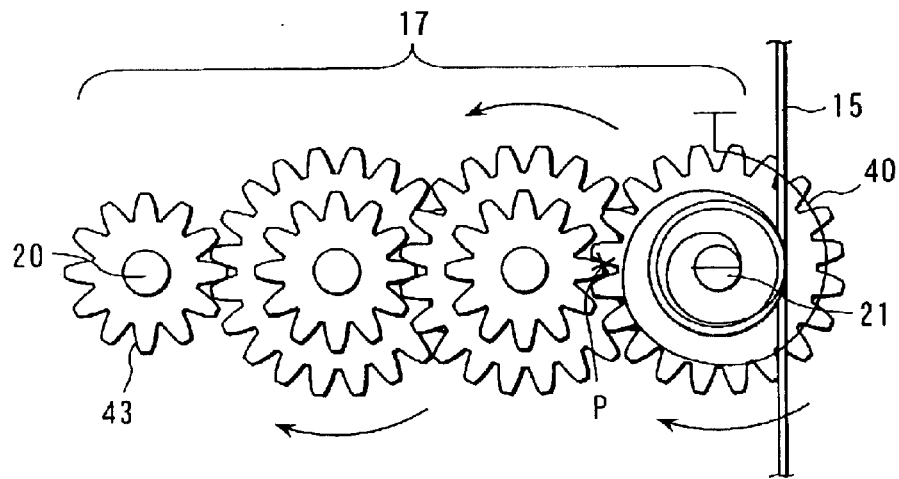
FIG. 4 is an explanatory view of a backlash removing means of the stage according to the first embodiment.

A first embodiment of the electromotive stage for the microscope will be described with reference to FIGS. 2 to 4. FIG. 2 is a perspective view of the electromotive stage for the microscope, FIG. 3 is a perspective view of a control unit managing the position of the stage, and FIG. 4 is an explanatory view of backlash removing means. As shown in FIG. 2, the sample 2 is put on a movable member 11 which can move in one direction with respect to a stationary member 10 to be attached to the microscope 1 (see FIG. 1). A kremmel 12 with the sample 2 held thereon slides on the movable member 11 in a direction perpendicular to the above-described direction. The electromotive stage 5 two-dimensionally scans the sample 2 with respect to the optical axis X of the microscope 1 (see FIG. 1). Preferably, the stage 5 is movable in the direction perpendicular to the optical axis X.

Guides between the stationary member 10 and movable member 11 will next be described. The electromotive stage 5 can move in two directions usually crossing at right angles to each other, but the guide for one direction is similar to the guide for the other direction in a constitution and action, and the description of the other guide is therefore omitted. V-shaped guide grooves 10a, 10b are formed in the stationary member 10. A holding member 13 is screwed to the movable member 11, and V-shaped guide grooves 11a, 13a are formed in parallel with the guide grooves 10a, 10b of the stationary member 10. Each ball 14 is inserted between the guide grooves formed opposite to each other. While the stationary member 10 is held between the movable member 11 and holding member 13, the holding member 13 is screwed to the stationary member 10. Therefore, the movable member 11 does not jounce. Moreover, since the movable member 11 is held with point contacts via the balls 14, a sliding resistance is small. Thereby, the member can move in one direction.

A wire rope 15 formed by twining a wire of a fine metal material is used in a power transmitter. Opposite ends of the wire rope 15 have annular shapes. The wire rope 15 is extended between two support pins 16 projecting from the movable member 11. One support pin 16 can move in a direction in which the wire rope 15 is extended. Moreover, a reducer 17 is disposed on the stationary member 10, and a pulley 18 attached onto a reducer output shaft 21 is disposed in a position contacting a line connecting two support pins 16. The wire rope 15 is once wound around the pulley 18.

When the movable support pin 16 is moved, a tensile force of the wire rope 15 is increased. Thereby, a frictional force of the pulley 18 and wire rope 15 can be increased, and a slip is not generated between the wire rope 15 and pulley 18 unless any overload is added. Moreover, the pulley 18 is positioned in contact with the wire rope 15, a total length of the wire rope 15 does not fluctuate with the movement of the movable member 11. By these two actions, the rotation of the pulley 18 can accurately be transmitted to the wire rope 15, and a rotation amount of the pulley 18 can be transformed into a linear movement amount of the movable member 11.

A stepping motor 20 is used in a driving source. As the stepping motor 20 receives a pulse signal from the outside, a rotor of the motor 20 is attracted with an electromagnetic force generated in a stator wire, and an output shaft of the motor 20 rotates by an angle proportional to the pulse signal. One rotation of the stepping motor 20 is divided into 200. A motor output shaft rotates by 1.8° with an input of one pulse signal.

When the pulley for driving the wire rope is directly attached to the output shaft of the stepping motor 20 disposed on the stationary member 10, the diameter of the pulley is 0.15 mm in order to obtain a solution of 2.5 μm, and this is not realistic. Therefore, the reducer 17 including spur gears for enhancing the solution is disposed on the stationary member 10. The reducer 17 includes the spur gears different in the number of teeth. The spur gears being different in the number of teeth are integrally disposed on the same shaft, and form sets of gears. The reducer 17 includes a plurality of sets of gears. Sets of gears form a train, and the gears being different in the number of teeth mesh with each other. The train of gears reduces a speed. The gear ratio of the gears meshing with each other is 1:4. When four trains of gears including a gear 21A of the reducer output shaft 21 and a motor gear 43 of the output shaft of the stepping motor 20 are used, a reduction ratio of 1/64 is obtained.

As described above, a division number of the rotation of the stepping motor 20 is 200. When the diameter of the pulley 18 of the reducer output shaft 21 around which the wire rope 15 is wound is 10 mm, the movement amount of the movable member 11 for each step of the stepping motor 20, that is, a solution is 10 mm×π/(200×64)÷2.5 μm. This solution makes a micro feed possible.

A control unit managing the position of the stage will next be described. As shown in FIG. 3, a photo interrupter origin sensor 30 is disposed on the stationary member 10. A shield plate 31 for shielding light of the origin sensor 30 is disposed on the movable member 11. The origin sensor 30 and shield plate 31 constitute an origin detector. When the movable member 11 is driven, the movable member 11 is initially moved in one predetermined direction, and the shield plate 31 shields light of the origin sensor 30. That is, after the origin position of the movable member 11 with respect to the stationary member 10 is set beforehand, the movable member 11 is driven by the pulse signal from a control unit 32. When the control unit 32 manages an output pulse number to the stepping motor 20, it is possible to manage the position of the movable member 11.

Backlash removing means of the reducer 17 will next be described. As shown in FIG. 2, a spiral spring 40 with a rotation force is attached between the reducer output shaft 21 and a spring support 10A disposed on the stationary member 10. The spring support 10A, spiral spring 40, and reducer output shaft 21 constitute an urging unit. An action of the spiral spring 40 will be described with reference to FIG. 4. In the stepping motor 20, a force keeping the position even in a non-excited state, that is, a detent torque acts. For example, when the detent torque of the stepping motor 20 is 0.05 N·m, and the torque of the spiral spring 40 is 32 N·m or less, the gear meshing with the motor gear 43 is constantly pressed onto the motor gear 43 of the stepping motor 20, and the backlash of gears is therefore removed. An x mark of FIG. 4 indicates a contact P of the meshing gears, and arrows indicate the direction of the torque generated by the spiral spring 40.

Actually, the torque by the spiral spring 40 is set to a value smaller than the above-described value in consideration of the torque of the stepping motor 20 during the driving. As shown in FIG. 2, a pin 42 is disposed on the reducer output shaft 21, two restriction members 41 are disposed on the stationary member 10 to restrict the rotation range of the reducer output shaft 21, thereby the spiral spring 40 acts without being damaged.

When the electromotive stage for the microscope according to the first embodiment is used, a feed with little lost motion can be realized. Since the wire rope 15 is a transmission element using the frictional force, a slip is generated between the wire rope 15 and pulley 18 with generation of the overload. For example, when a foreign matter is caught between the movable member 11 and stationary member 10, the slip occurs, the driving force of the stepping motor 20 is not transmitted to the movable member 11, and the electromotive stage and the caught foreign matter can therefore be prevented from being damaged.

However, when the slip occurs, a deviation is generated in the operation range of the spiral spring 40 and the movement range of the movable member 11, further the pin 42 collides against the restriction members 41, and the movable member 11 cannot move. To solve the problem, when the wire rope 15 slips against the pulley 18 by an external force, the positions of the movable member 11 and spiral spring 40 are adjusted in the following driving method. The movement range of the movable member 11 to the stationary member 10 is known. The range is represented by a pulse number ZZ of the stepping motor 20. After feeding the movable member 11 in opposite movable directions by ZZ pulses+α pulses, an origin detection operation is performed. As a result, the movement range of the movable member 11 is included in the operation range of the spiral spring 40, and the movable member 11 is positioned in the origin of the stationary member 10. α is an allowance value including the deviation by a mechanical error of the movable member 11. The operation range of the spiral spring 40 is set to be sufficiently larger than the movement range of the movable member 11.

According to the first embodiment, there can be provided a high precision and inexpensive electromotive stage for the microscope, in which any protrusion is not disposed on the upper surface of the stage in a simple constitution, operationality is satisfactory, and lost motion is little.

(Second Embodiment)

Figure 5:
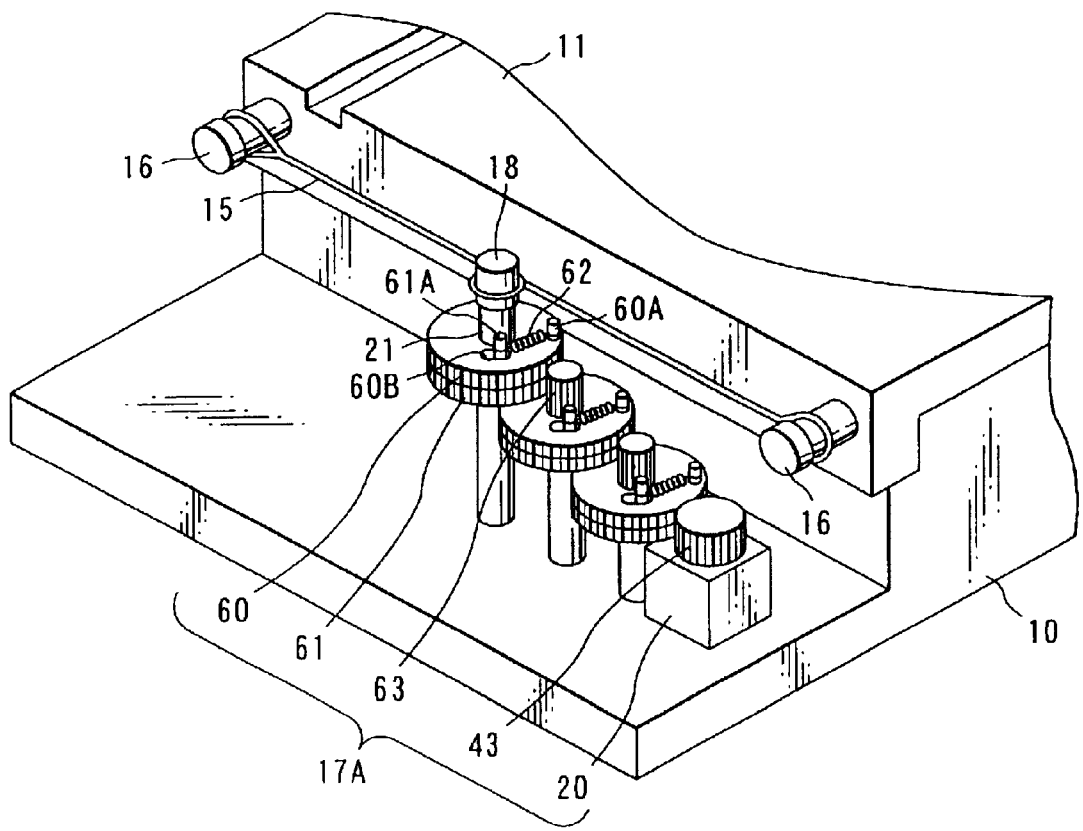
FIG. 5 is a perspective view of an electromotive stage according to a second embodiment.
Figure 6:
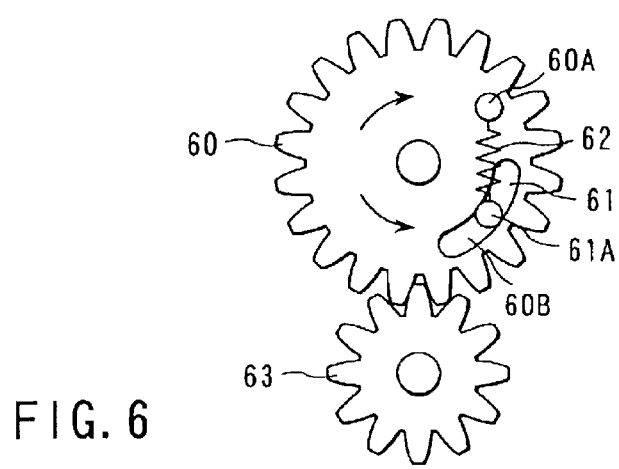
FIG. 6 is an explanatory view of a backlash removing means of the stage according to the second embodiment.

A second embodiment of the electromotive stage for the microscope will be described with reference to FIGS. 5 and 6. FIG. 5 is a perspective view of the electromotive stage for the microscope, and FIG. 6 is an explanatory view of the backlash removing means. The second embodiment is different from the first embodiment only in the backlash removing means of the reducer. Since other constituting elements are the same as those of the first embodiment, only different constituting elements will be described, and the drawing and description of a similar part are omitted. In FIGS. 5 and 6, the same constituting elements as those of the first embodiment are denoted with the same reference numerals, and the description thereof is omitted.

In FIGS. 5 and 6, a reduction gear 61 is the spur gear of a reducer 17A, and an urging gear 60 equal to the reduction gear 61 in a module and the number of teeth is rotatably attached to the reducer output shaft 21 on the upper surface of the reduction gear 61. A tensile spring 62 having a resilient force is extended between a pin 61A of the reduction gear 61 and a pin 60A of the urging gear 60 which project from an elongate hole 60B formed in the urging gear 60. The reduction gear 61 on an output side and the urging gear 60 urged by the tensile spring 62 mesh with the spur gear disposed on the rotation shaft on a driving side and having the same module, that is, a meshing gear 63. The tooth of the gear 63 is held between the tooth of the reduction gear 61 and the tooth of urging gear 60. The urging gear 60, pin 60A, pin 61A, and tensile spring 62 constitute the urging unit. In FIG. 5, for three sets of gears constituting the reducer 17A, the remaining two sets are constituted similarly as the set of the reduction gear 61 and urging gear 60.

The urging gear 60 is constantly pressed onto the meshing gear 63 with the rotation force of one direction (clockwise direction). Therefore, the backlash as a jounce for smoothly rotating the gears is removed, and a reduction mechanism with little lost motion can be realized.

According to the second embodiment, since the meshing gear 63 on the driving side is held between the reduction gear 61 on the output side and the urging gear 60, the reduction mechanism with a reduced lost motion is realized, as with the first embodiment. An effect similar to that of the first embodiment is obtained.

(Third Embodiment)

Figure 7:
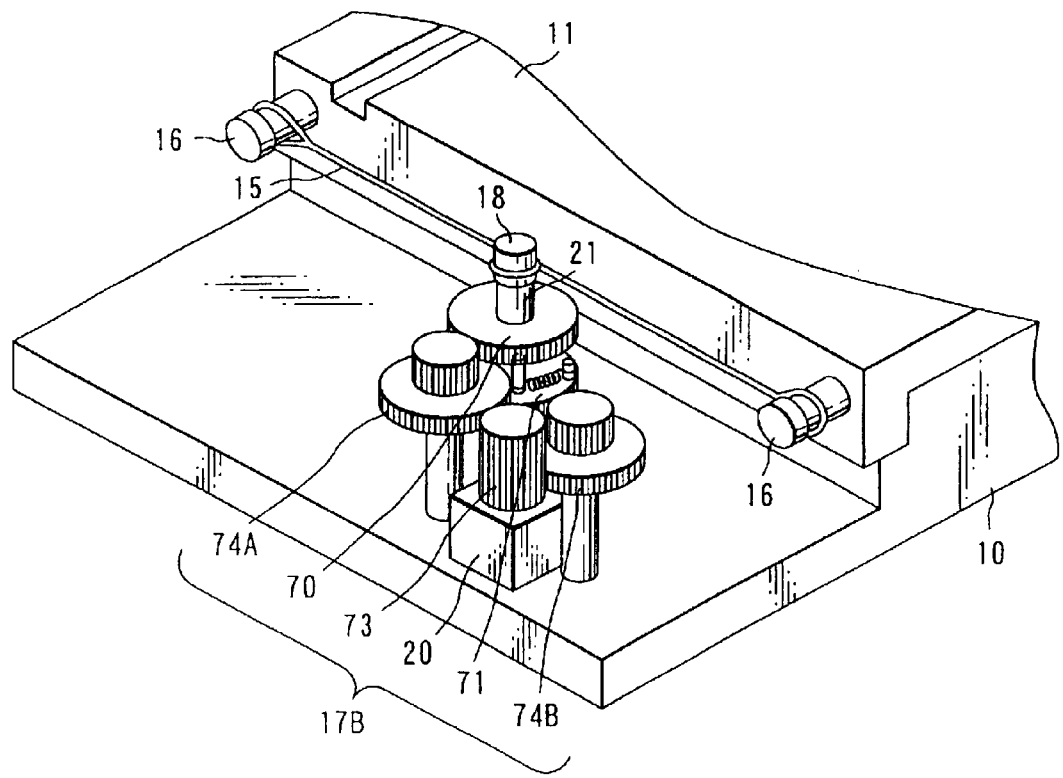
FIG. 7 is a perspective view of an electromotive stage according to a third embodiment.
Figure 8:
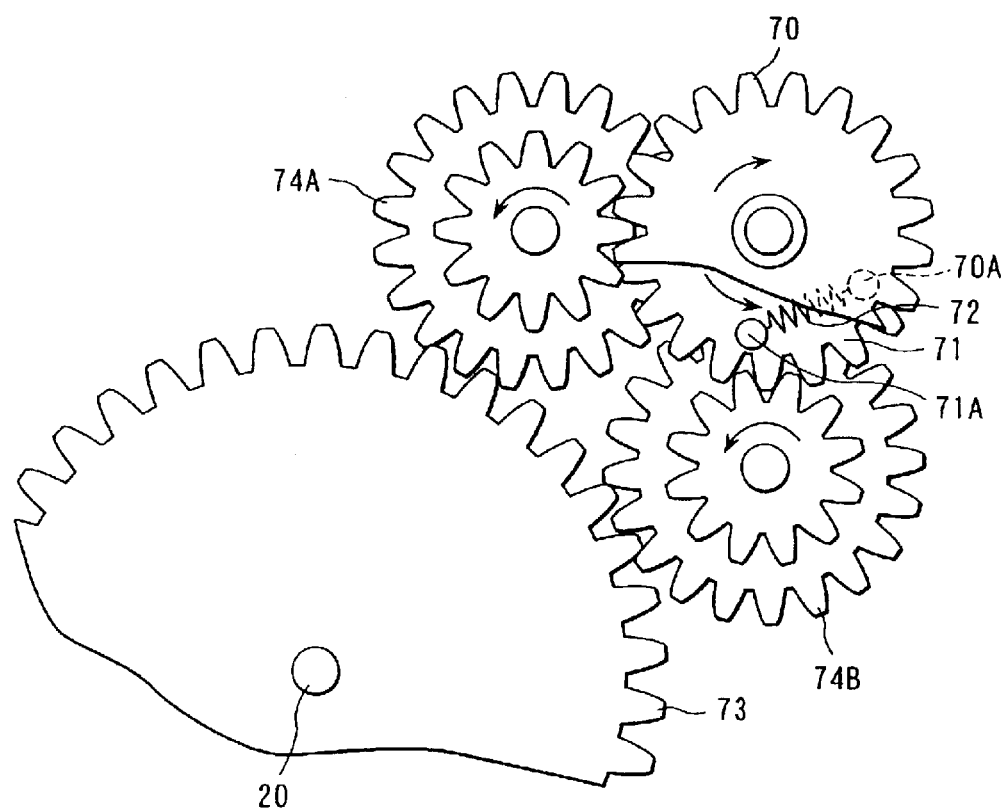
FIG. 8 is an explanatory view of a backlash removing means of the stage according to the third embodiment.

A third embodiment of the electromotive stage for the microscope will be described with reference to FIGS. 7 and 8. FIG. 7 is a perspective view of the electromotive stage for the microscope, and FIG. 8 is an explanatory view of the backlash removing means. The third embodiment is different from the first and second embodiments only in the backlash removing means of the reducer. Since the other constituting elements are the same as those of the first and second embodiments, only the different constituting elements will be described, and the drawing and description of the same constituting elements are omitted. In FIGS. 7 and 8, the same constituting elements as those of the first and second embodiments are denoted with the same reference numerals, and the description thereof is omitted.

In FIGS. 7 and 8, the spur gear, that is, an output gear 70 is disposed on the upper portion of the reducer output shaft 21 of a reducer 17B, and an urging gear 71 equal to the output gear 70 in the module and teeth number is rotatably disposed on the lower portion of the reducer output shaft 21. An elastic member, that is, a tensile spring 72 is extended between a pin 70A vertically disposed on the lower surface of the output gear 70 and a pin 71A disposed on the upper surface of the urging gear 71. A reduction gear 74A is disposed between a motor gear 73 of the stepping motor 20 and the output gear 70 so as to mesh with both the gears. A reduction gear 74B is disposed between the motor gear 73 and the urging gear 71 so as to mesh with both the gears. The urging gear 71, pins 70A, 71A, and tensile spring 72 constitute the urging unit. Since the constitutions of the reduction gears 74A, 74B are similar to those of the reduction gears of the first embodiment, the description thereof is omitted.

By the constitution, since the tensile spring 72 is expanded more than a free length, the urging gear 71 and reduction gear 74A are urged in a counterclockwise direction, and the output gear 70 and reduction gear 74B are urged in a clockwise direction. Thereby, since the reduction gear 74A and output gear 70 are constantly pressed in one direction with respect to the motor gear 73, the backlash of the gears is removed, and the reducer with little lost motion is realized. Even if a plurality of sets of reduction gears are used in order to obtain a larger reduction ratio, the similar action and effect is obtained.

According to the third embodiment, since the tensile spring is extended only in one position, the assembling is easy. Moreover, the effect similar to that of the first embodiment is also achieved.

(Fourth Embodiment)

Figure 9:
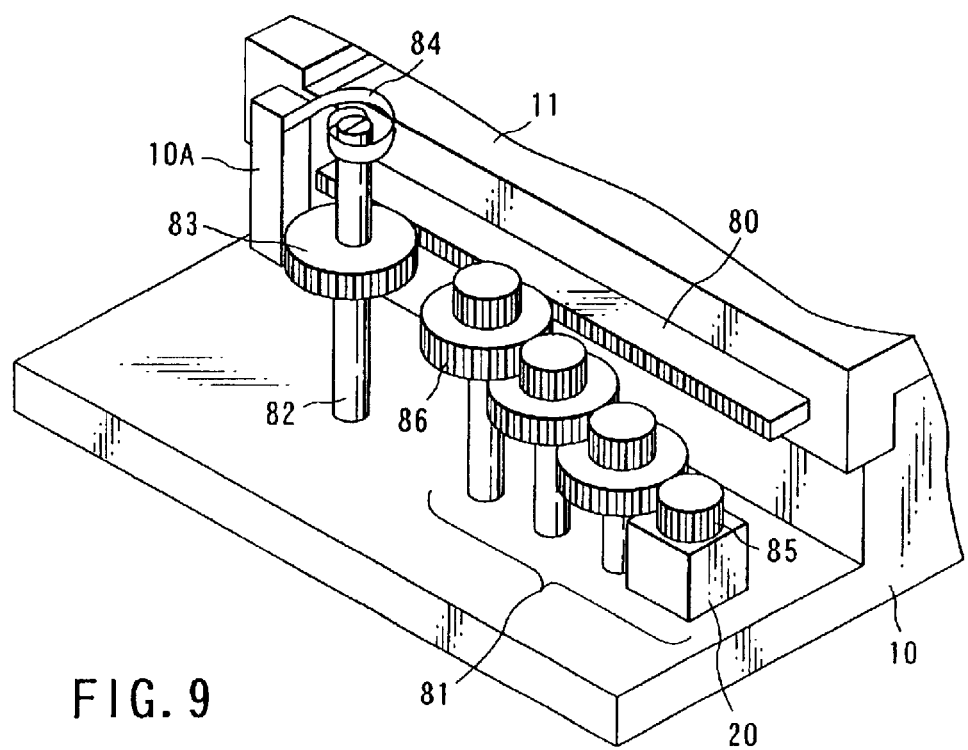
FIG. 9 is a perspective view of an electromotive stage according to a fourth embodiment.

A fourth embodiment of the electromotive stage for the microscope will be described with reference to FIG. 9. FIG. 9 is a perspective view of the electromotive stage for the microscope. The fourth embodiment is different from the first embodiment only in the driving mechanism of the movable member and the backlash removing means of the reducer. Since the other constituting elements are the same as those of the first embodiment, only the different constituting elements will be described, and the drawing and description of the same constituting elements are omitted. In FIG. 9, the same constituting elements as those of the first embodiment are denoted with the same reference numerals, and the description thereof is omitted.

In FIG. 9, a rack 80 is disposed on the side surface of the movable member 11. A reducer 81 having the train of spur gears is disposed on the stationary member 10, and a pinion of the reducer 81, that is, an output gear 86 meshes with the rack 80. Moreover, a rotation shaft 82 is disposed in the vicinity of the reducer 81 on the stationary member 10, and an urging gear 83 formed by the spur gear having the same module and teeth number as those of the output gear 86 is rotatably attached to the rotation shaft 82. The urging gear 83 meshes with the rack 80. A spiral spring 84 is disposed between the urging gear 83 and the spring support 10A projecting from the stationary member 10. The spring support 10A, rotation shaft 82, urging gear 83, and spiral spring 84 constitute the urging unit.

The rotation force by the spiral spring 84 is transmitted to the reducer 81 from the urging gear 83 via the rack 80. The transmitted force becomes the force pressing a motor gear 85 attached to the output shaft of the stepping motor 20.

According to the fourth embodiment, the effect similar to that of the first embodiment is obtained.

(Fifth Embodiment)

A fifth embodiment of the electromotive stage for the microscope will be described with reference to FIG. 10. FIG. 10 is a perspective view of the electromotive stage for the microscope. The fifth embodiment is different from the first embodiment only in the driving mechanism of the movable member and the backlash removing means of the reducer. Since the other constituting elements are the same as those of the first embodiment, only the different constituting elements will be described, and the drawing and description of the same constituting elements are omitted. The same constituting elements as those of the first embodiment are denoted with the same reference numerals, and the description thereof is omitted.

In FIG. 10, a rack 90 is disposed on the side surface of the movable member 11. An urging gear having the same module as the rack 90, that is, an urging rack 92 is disposed on the upper surface of the rack 90. Two pins 91 disposed on the rack 90 are slidably inserted in two elongate holes 92a formed in the urging rack 92, respectively. Pins 93 are disposed in the vicinity of the elongate holes 92a of the urging rack 92, and an elastic member, that is, tensile springs 94 are extended between the pins 91 and 93. In the stationary member 10, a reducer 95 having the gear train similar to the gear train (see FIGS. 5, 6) constituted by a combination of the urging gear 60 and reduction gear 61 of the second embodiment is disposed. An output gear 96 as the pinion of the reducer 95 meshes with the rack 90 and urging rack 92. The pins 91, urging rack 92, elongate holes 92a, pins 93, and tensile springs 94 constitute the urging unit.

Since the width of each elongate hole 92a formed in the urging rack 92 is set to be larger than the diameter of each pin 91 disposed on the rack 90 by about several micrometers, there is hardly jounce, and the movement in one direction is possible. After applying a force to tensile springs 94 and matching the teeth of the rack 90 with the teeth of the urging rack 92, the rack 90 and the urging rack 92 mesh with the output gear 96. Then the rack 90 is constantly pressed onto the output gear 96.

According to the fifth embodiment, since the rack 90 is constantly pressed onto the output gear 96, the lost motion is not generated by the backlash. Moreover, the effect similar to that of the first embodiment is obtained.

(Sixth Embodiment)

Figure 11:
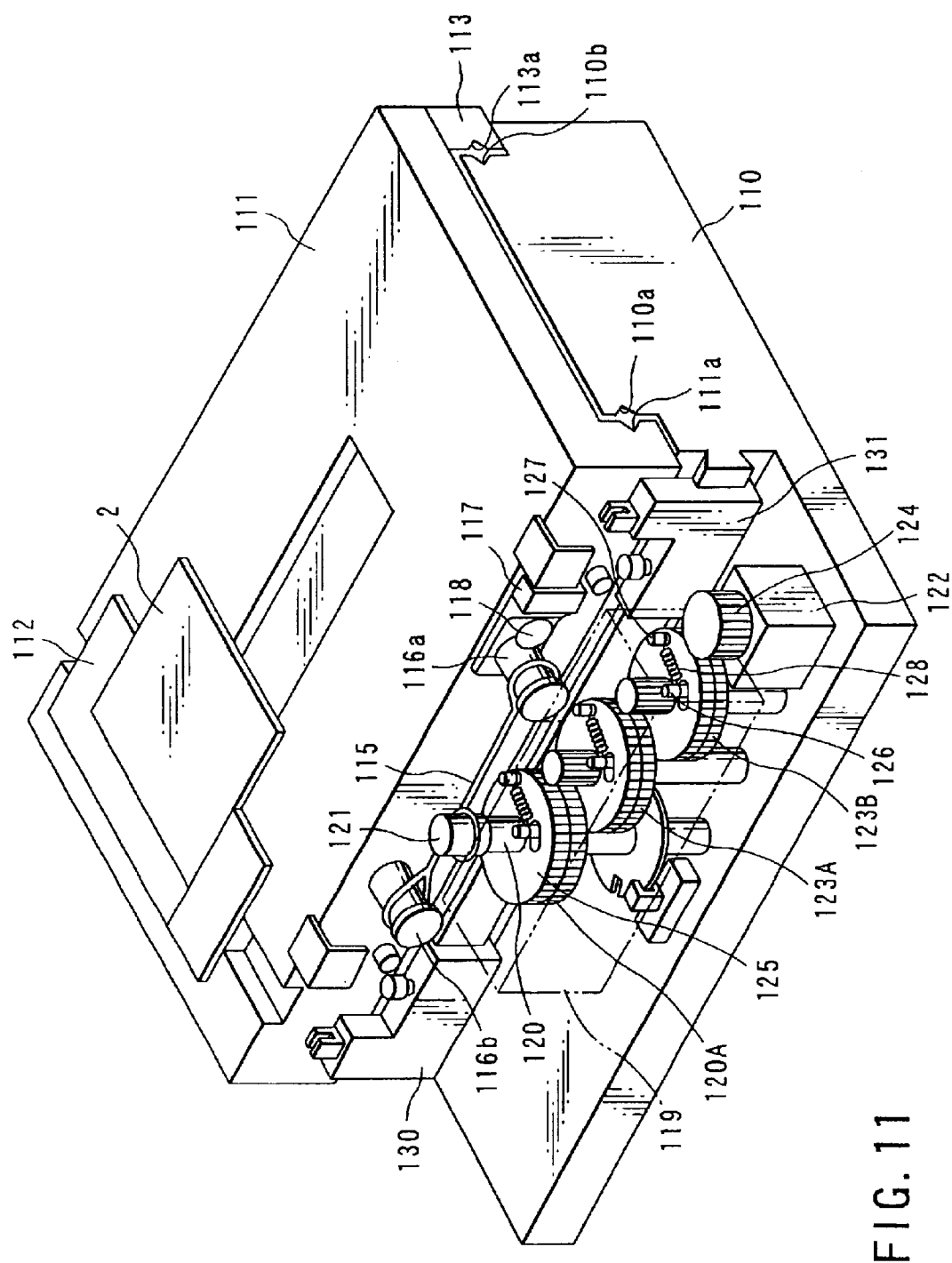
FIG. 11 is a perspective view of an electromotive stage according to a sixth embodiment.
Figure 15:
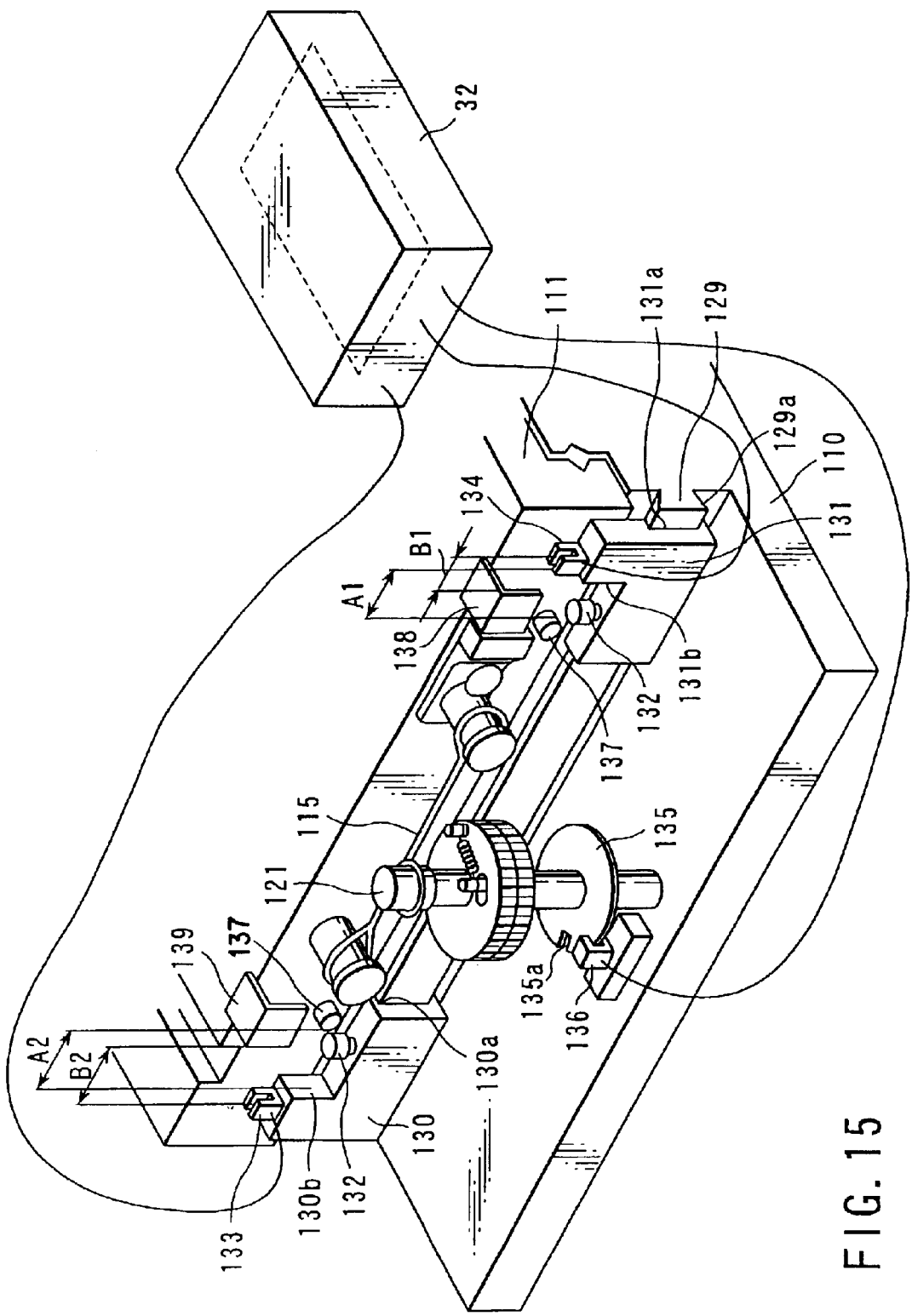
FIG. 15 is an explanatory view of an origin detector of the stage according to the sixth embodiment.
Figure 16:
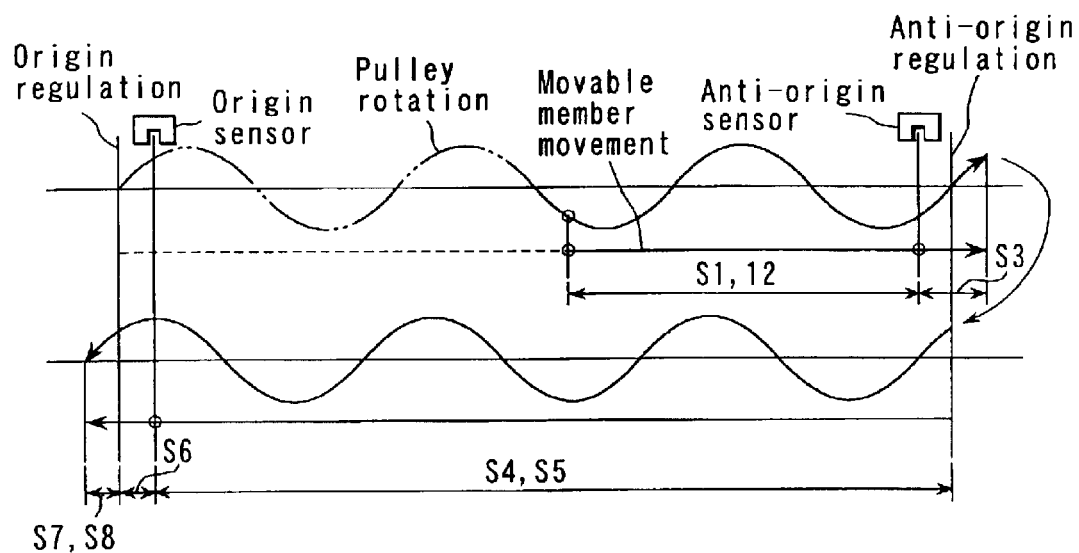
FIG. 16 is an explanatory view of an origin detection operation of the stage according to the sixth embodiment.
Figures 18A, 18B:
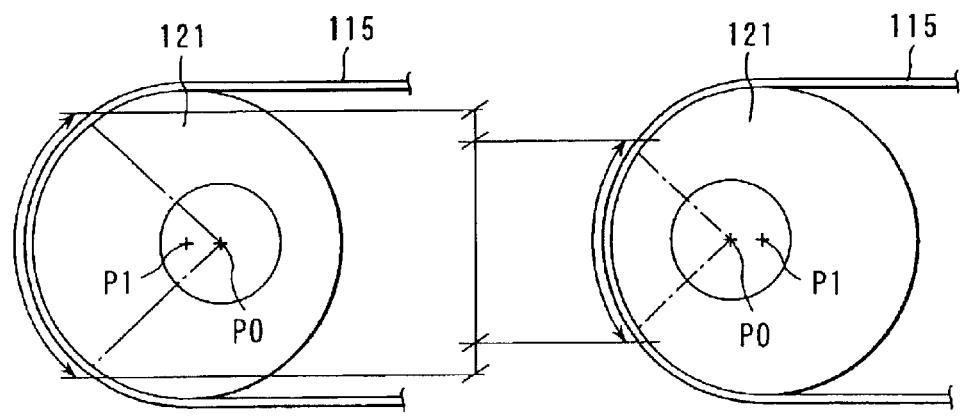
FIG. 18A is an explanatory view showing that a center P1 of the periphery of a pulley is positioned between a center P0 of the rotation shaft and the contact surface of the pulley in contact with a wire rope.
FIG. 18B is an explanatory view showing that the center P0 is positioned between the center P1 and the contact surface.
Figure 17:
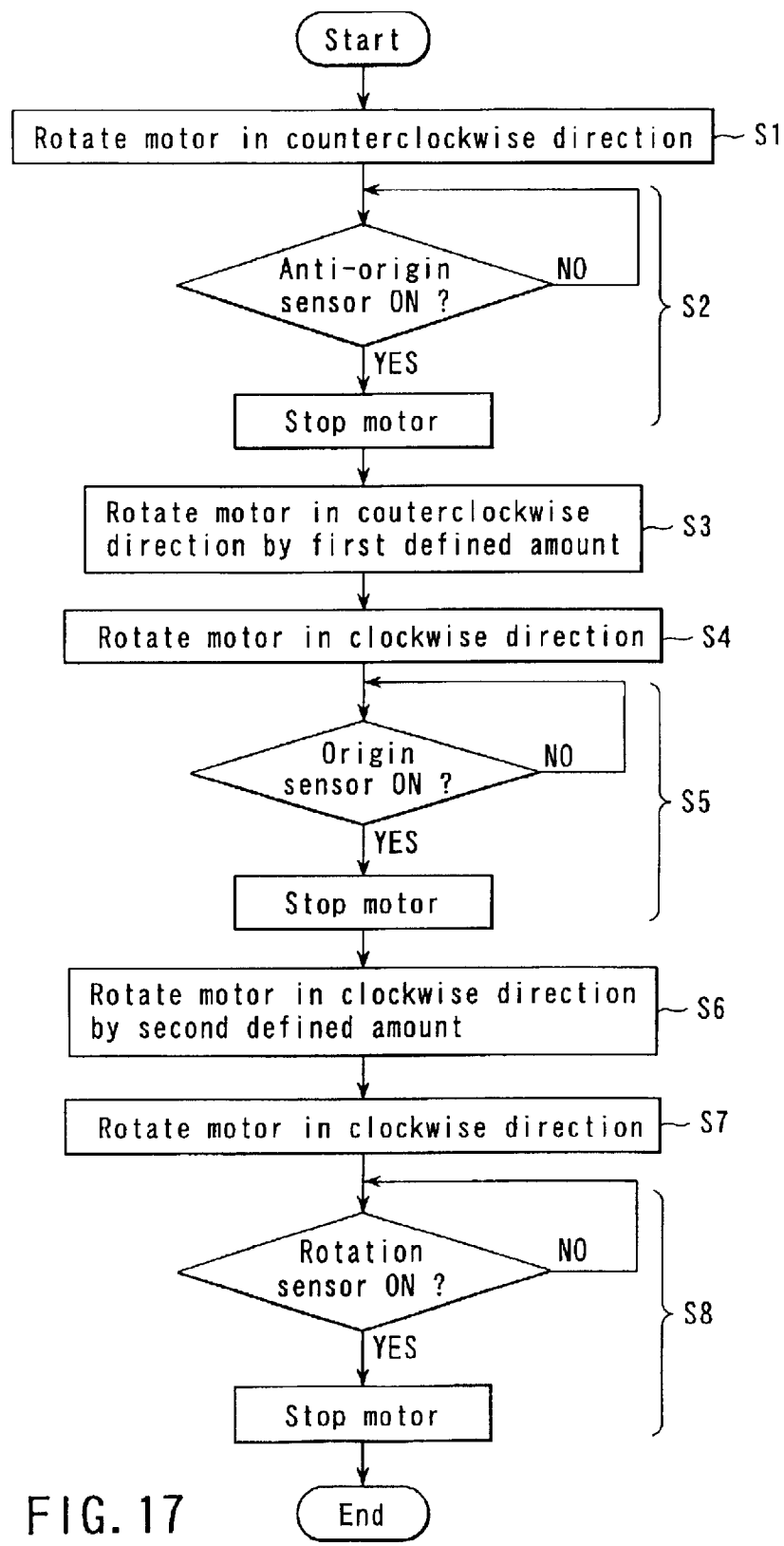
FIG. 17 is a first flowchart of the origin detection operation of the stage according to the sixth embodiment.
Figure 19:
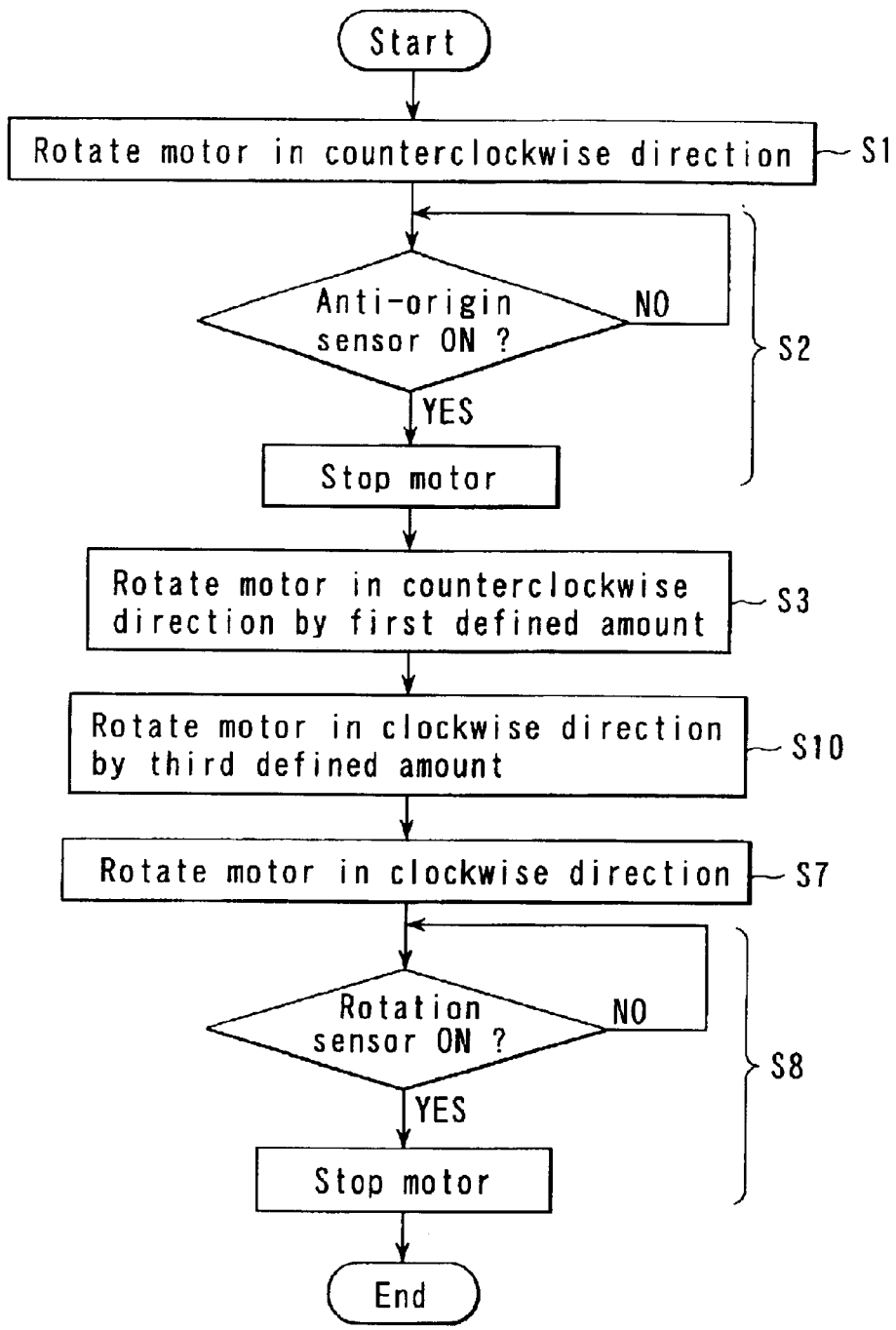
FIG. 19 is a second flowchart of the origin detection operation of the stage according to the sixth embodiment.

A sixth embodiment of the electromotive stage for the microscope will be described with reference to FIGS. 11 to 19. FIG. 11 is a perspective view of the electromotive stage for the microscope, FIG. 12 is an enlarged side view of a guide between the stationary member and movable member, FIG. 13 is an enlarged sectional view of a tensile force adjuster of the wire rope, FIG. 14 is an explanatory view of the backlash removing means, FIG. 15 is an explanatory view of an origin detector, FIG. 16 is an explanatory view of an origin detection operation, FIG. 17 is a first flowchart of the origin detection operation, FIGS. 18A and 18B are explanatory views of a movement amount change by eccentricity of a driving pulley, and FIG. 19 is a second flowchart of the origin detection operation.

The sample 2 is laid on a movable member 111 which can move in one direction with respect to a stationary member 110 to be attached to the microscope 1 (see FIG. 1). A kremmel 112 holding the sample 2 slides on the movable member 111 in a direction perpendicular to the above-described direction. The electromotive stage 5 two-dimensionally scans the sample 2 with respect to the optical axis X (see FIG. 1) of the microscope 1.

A guide for performing a translatory motion between the stationary member 110 and movable member 111 will next be described. In FIG. 1, the electromotive stage 5 usually includes the guides which can move in two directions crossing at right angles to each other, but the guide for one direction is similar to the guide for the other direction in the constitution and action, and the description of the other guide is therefore omitted. In FIG. 11, V-shaped guide grooves 110a, 110b are formed in the stationary member 110. A holding member 113 is screwed to the movable member 111. V-shaped guide grooves 111a, 113a are formed on the movable member 111 in parallel with the guide grooves 110a, 110b of the stationary member 110. As shown in FIG. 12, a ball 114 is inserted between the guide grooves disposed opposite to each other. While the stationary member 110 is held between the movable member 111 and holding member 113 (see FIG. 11), the holding member 113 is screwed to the stationary member 110. Therefore, the movable member 111 does not jounce. Moreover, since the movable member 111 is held with point contacts via the balls 114, the sliding resistance is small. Thereby, the member can move in one direction.

A wire rope 115 formed by twining the fine wire of the metal material is used in the power transmitter. The opposite ends of the wire rope 115 have annular shapes. As shown in FIG. 13, the wire rope 115 is extended between a support pin 116b disposed on the movable member 111 and a support pin 116a screwed to a tensile force adjustment member 117. The tensile force adjustment member 117 has a slope forming an angle of 45 degrees with the surface perpendicular to the wire rope 115. This slope also forms an angle of 45 degrees with the surface of the movable member 111 to which the tensile force adjustment member 117 is attached. A flat head screw 118 includes a conical portion which has a line contact with the slope of the tensile force adjustment member 117. In FIG. 11, a reducer 119 is disposed in the stationary member 110. A driving pulley 121 attached onto a reducer output shaft 120 of the reducer 119 is disposed in a position which contacts a line connecting two support pins 116a, 116b. The wire rope 115 is once wound around the driving pulley 121.

When the flat head screw 118 is screwed in and the tensile force adjustment member 117 is moved in the extending direction of the wire rope 115, the tensile force of the wire rope 115 increases. With the increase of the tensile force, the sliding resistance of the movable member 111 is small. As long as the movable member 111 is continuously moved with acceleration within an actual use range, the slip does not occur between the driving pulley 121 and the wire rope 115. Since the driving pulley 121 is disposed in a position to contact the wire rope 115, the total length of the wire rope 115 does not fluctuate with the movement of the movable member 111. Therefore, the rotation amount of the driving source is proportional to the movement amount of the movable member 111. That is, when the rotation amount of the driving pulley 121 is controlled, it is possible to accurately control the movement amount of the movable member 111.

A stepping motor 122 is used in the driving source. As the stepping motor 122 receives a pulse signal from the outside, a rotor of the motor 122 is attracted with an electromagnetic force generated in a stator wire, and an output shaft of the motor 122 rotates by an angle proportional to the pulse signal. One rotation of the stepping motor 122 is divided into 200. A motor output shaft rotates by 1.8° with an input of one pulse signal.

When the minimum movement amount of the movable member 111 necessary in the microscope, that is, a solution $\Delta$ is set to 2.5 $\mu$m, and when the pulley for driving the wire rope is directly attached to the output shaft of the stepping motor 122 disposed in the stationary member 110, the diameter of the pulley needs to be 0.15 mm. This is not realistic, considering a minimum radius of curvature of the bended wire rope, or a mechanical strength of a pulley shaft. In the sixth embodiment, in order to enhance the solution $\Delta$, the reducer 119 including the spur gear is disposed. For example, in the speed reduction by the gears having twenty teeth and eighty teeth, when the gear with twenty teeth is rotated once, the gear with eighty teeth rotates by 1/4, and a rotation number is reduced to 1/4. The gears having twenty teeth and eighty teeth are integrally constituted on the same shaft, and form a set of gears. The reducer 119 includes two sets of gears, and the gears having different numbers of teeth mesh with each other. These sets of gears include reduction gears 123A, 123B. When these sets of gears, a reducer output gear 120A attached to the reducer output shaft 120, and a motor gear 124 attached to the output shaft of the stepping motor 122 are combined, the speed reduction is performed in three stages. The reduction ratio is 1/64.

As described above, the division number of the rotation of the stepping motor 122 is 200. When the diameter of the pulley 121 of the reducer output shaft 120 around which the wire rope 115 is wound is 10 mm, the solution $\Delta$ of the movable member 111 is $\Delta$=10 mm×$\pi$/(200×64)÷2.5 $\mu$m. This solution $\Delta$ is realistic.

The backlash removing means of the reducer 119 will next be described. In FIGS. 11 and 14, Urging gears 125 are rotatably attached to the spur gears of the reducer 119, that is, the reduction gears 123A, 123B and reducer output gear 120A. Urging gears 125 are equal to gears 123A, 123B and 120A in the module and teeth number. Tensile springs 128 having a resilient force are extended between spring hooks 126 and spring hooks 127. Spring hooks 126 are formed in the reduction gears 123A, 123B and reducer output gear 120A. Spring hooks 127 are disposed on urging gears 125. In FIG. 14, the spring hook 126 projects out of an elongate hole 125a which is formed in the urging gear 125 attached to the reduction gears 123B. Since the module and teeth number of the urging gear 125 are the same as those of the reduction gear 123B, the outer diameter of the urging gear 125 is equal to that of the reduction gear 123B. However, for ease of understanding the description, the urging gear 125 is smaller than the reduction gear 123B in FIG. 14.

The reduction gear 123B is fixed, and the urging gear 125 is turned in the direction in which the tensile spring 128 expands, that is, in the clockwise direction in FIG. 14. When the urging gear 125 is turned, the teeth of the urging gear 125 deviate from the teeth of the reduction gear 123B. When the urging gear is further turned, the teeth of the urging gear 125 overlap with the teeth of the reduction gear 123B. Moreover, when the gear is further turn, the teeth deviate and overlap. Until deviating and overlapping occur twice or more, the urging gear 125 is turned. Thereafter, the urging gear 125 is fixed, and the motor gear 124 meshes with the reduction gear 123B and urging gear 125. As the fixed reduction gear 123B and urging gear 125 are released with the gears meshing, the tensile spring 128 brings together the reduction gear 123B and urging gear 125. In this case, the reduction gear 123B rotates in the clockwise direction, and urging gear 125 rotates in the counterclockwise direction. As a result, the reduction gear 123B and urging gear 125 abut on the motor gear 124. The tensile spring 128 is expanded. Therefore, once the gears mesh with each other, the tensile spring 128 continues to act. That is, even with the backlash necessary for the gear power transmission, the reduction gear 123B constantly abuts on the motor gear 124 in one direction. Therefore, the gear power transmission is not influenced by the backlash. The urging gears 125, spring hooks 126, 127, and tensile springs 128 constitute the urging unit. In FIG. 11, the set of the reduction gear 123A and urging gear 125 attached to the gear 123A, and the set of the reducer output gear 120A and urging gear 125 attached to the gear 120A are constituted similarly as the set of the reduction gear 123B and urging gear 125.

The origin detector performing a relative positioning of the stationary member 110 and movable member 111 will next be described. In FIG. 15, a regulation member guide portion 129 including a dovetail rail 129a extending in parallel with the movement direction of the movable member 111 is formed in the stationary member 110. Dovetail grooves 130a, 131a in surface contact with the dovetail rail 129a are formed in regulation members, that is, an origin regulation member 130 and anti-origin regulation member 131. Fixed knobs 132 for pressing the dovetail grooves 130a, 131a onto the dovetail rail 129a are screwed to the origin regulation member 130 and anti-origin regulation member 131. Regulation surfaces 130b, 131b which abut on abutment pins 137 projecting from the side surface of the movable member 111 are formed in the origin regulation member 130 and anti-origin regulation member 131. An origin sensor 133 and anti-origin sensor 134 forming photo interrupter sensors are disposed in the vicinity of the regulation surfaces 130b, 131b. The origin sensor 133 and anti-origin sensor 134 move together with the origin regulation member 130 and anti-origin regulation member 131. An origin shield plate 139 and anti-origin shield plate 138 are disposed on a movement path of the origin sensor 133 and anti-origin sensor 134. The origin shield plate 139 and anti-origin shield plate 138 are fixed to the movable member 111.

When the fixed knobs 132 are screwed in, the dovetail grooves 130a of the origin regulation member 130, and the dovetail grooves 131a of the anti-origin regulation member 131 are pressed onto the dovetail rail 129a of the regulation member guide portion 129. Thereby, the origin regulation member 130 and anti-origin regulation member 131 can be fixed in the optional positions on the regulation member guide portion 129. A shield disc 135 rotates together with the driving pulley 121. The rotation shaft of the driving pulley 121 is passed through the center of the shield disc 135. A cutout 135a is formed in the peripheral edge of the shield disc 135. A pulley rotation sensor 136 for detecting the position of the cutout 135a is disposed in the stationary member 110. The origin sensor 133, anti-origin sensor 134, and pulley rotation sensor 136 are connected to the control unit 32. The origin sensor 133, anti-origin sensor 134, anti-origin shield plate 138, origin shield plate 139, shield disc 135, pulley rotation sensor 136, and control unit 32 constitute the origin detector.

A control flow of the origin detector will next be described with reference to FIGS. 15 to 17. It is assumed that the rotation direction of the stepping motor 122 (see FIG. 11) moving the movable member 111 from the anti-origin regulation member 131 side toward the origin regulation member 130 side is the clockwise direction. It is also assumed that the rotation direction of the stepping motor 122 moving the movable member 111 to the anti-origin regulation member 131 side is the counterclockwise direction. FIG. 16 shows the position of the movable member 111 to the stationary member 110, and an angle between the pulley rotation sensor 136 and the cutout 135a of the shield disc 135 by means of a sin function. FIG. 17 is a first flowchart showing the control flow.

The control flow will be described. Upon receiving a start command, the stepping motor 122 (see FIG. 11) is rotated in the counterclockwise direction, and the movable member 111 is moved in the direction of the anti-origin regulation member 131 (step S1). When the anti-origin sensor 134 detects the anti-origin shield plate 138, the movable member 111 is stopped (step S2). The stepping motor 122 is rotated in the counterclockwise direction by a first defined amount K1 (step S3). Here, the first defined amount K1 is defined in the following equation.

$$K1 = A1 - B1 + \alpha$$

A1: Distance to the abutment pins 137 from the regulation surface 131b of the anti-origin regulation member 131
B1: Distance to the anti-origin shield plate 138 from the anti-origin sensor 134
α: 0.1 mm In the step S3, in consideration of a detection error of the anti-origin sensor 134, and errors of the positions of the anti-origin shield plate 138 and abutment pins 137 with respect to the anti-origin regulation member 131 and movable member 111, the stepping motor 122 (see FIG. 11) is driven so that the anti-origin regulation member 131 securely abuts on the abutment pin 137. Additionally, the slip amount of the wire rope 115 is set to be minimum.

The stepping motor 122 (see FIG. 11) is rotated in the clockwise direction (step S4). When the origin sensor 133 detects the origin shield plate 139 fixed to the movable member 111, the movable member 111 is stopped (step S5). The stepping motor 122 is rotated in the clockwise direction by a second defined amount K2 (step S6). Here, the second defined amount K2 is defined in the following equation.

$$K2 = A2 - B2 + \alpha$$

A2: Distance to the abutment pins 137 from the regulation surface 130b of the origin regulation member 130
B2: Distance to the origin shield plate 139 from the origin sensor 133
α: 0.1 mm In the steps S4 to S6, the stepping motor 122 (see FIG. 11) is driven so that the origin regulation member 130 securely abuts on the abutment pin 137. The slip amount of the wire rope 115 is minimum. The stepping motor 122 is rotated in the clockwise direction (step S7). The pulley rotation sensor 136 detects the rotation position of the driving pulley 121 (step S8), and the origin detection ends.

Abutting the movable member 111 on the stationary member 110 performs positioning of the stationary member 110 and movable member 111. The mechanical positioning by the power transmission mechanism including the general ball screw gives the mechanism the overload, and then the mechanism is damaged. This is not realistic. However, when the wire rope 115 is used as power transmission means, the slip occurs between the wire rope 115 and driving pulley 121, and the overload does not act on the member included in the mechanism. However, strictly, the slip between the wire rope 115 and driving pulley 121 results in the abrasion of the wire rope 115. Therefore, the slip amount is preferably small.

The driving pulley 121 and reducer 119 (see FIG. 11) are constituted of rotation member, respectively, as described above. In a general processing method, eccentric amounts of the pulley and rotation shaft are several micrometers, and the eccentric amount goes to the error of the movement amount of the movable member 111. FIG. 18A shows that a center P1 of the periphery of the driving pulley 121 is positioned between a center P0 of the rotation shaft and a contact surface of the driving pulley 121 in contact with the wire rope 115. FIG. 18B shows that the center P0 is positioned between the center P1 and the contact surface. In both states, there is a difference in the feed amount of the wire rope 115 by the driving pulley 121.

That is, every rotation of the driving pulley 121, a difference based on the eccentric amount is generated between the rotation angle of the driving pulley 121 and the feed amount of the wire rope 115 which have to be in a proportional relation. The eccentric amount depends on a processing precision. It is not realistic to set the processing precision to 10 μm or less. To solve the problem, origin detector can position the stationary member 110 and movable member 111 in order to synchronize the movement of the movable member 111 with the rotation of the driving pulley 121. The reduction ratio of the reducer 119 (see FIG. 11) is set to an integer ratio of 1:4 as described above, so that not only the eccentricity of the driving pulley 121 but also eccentricities of other rotation members match the synchronization.

The slip between the wire rope 115 and driving pulley 121 is not generated in a normal use. However, to detect the origin, the slip is mechanically generated between the wire rope 115 and driving pulley 121. In the origin detection, the motor is rotated in the counterclockwise direction in step S3 (see FIGS. 16, 17). Thereafter, when the movable member 111 is on an origin side in steps S7 and S8, the motor is rotated in the clockwise direction, and the slip is generated. Thereby the rotation positioning of the driving pulley 121 is performed.

In actual, the slip is hardly generated between the wire rope 115 and driving pulley 121. When the slip is not generated, and when the origin is detected without performing the steps S1 to S3, the driving pulley 121 has to slip by about one rotation for rotation positioning of the driving pulley 121. In a case in which the steps S1 to S3 are not performed, the pulley needs to slip about 100 times as compared with a case in which the steps S1 to S3 are performed.

In the present embodiment, the regulation member can be moved, but the regulation member may not move. In this case, the origin sensor 133 is not used. FIG. 19 shows a control flow. In place of steps S4 to S6 of the control flow of FIG. 17, the stepping motor is rotated in the clockwise direction by a third defined amount K3 (step S10). Here, the third defined amount K3 is defined in the following equation.

$$K3=S+\alpha$$

S: Movement range of the movable member 111 with respect to the stationary member 110, regulated by the regulation members 130, 131

α: Allowance value

According to the present embodiment, there can be provided a high precision and inexpensive electromotive stage for the microscope, in which any protrusion is not disposed on the upper surface of the stage in the simple constitution, operationality is satisfactory, and lost motion is little. Moreover, when the regulation member can be moved, and when the observation range of the sample is small with respect to the movement range of the movable member, limiting the movement range of the movable member permit wasteful motion in detecting the origin to vanish. Thereby, the operation tact is enhanced, and collision of the sample with the objective lens is avoided. Furthermore, when the regulation member does not move, the regulation member including the sensor and guide can be simplified, and cost reduction is possible.

(Seventh Embodiment)

Figure 20:
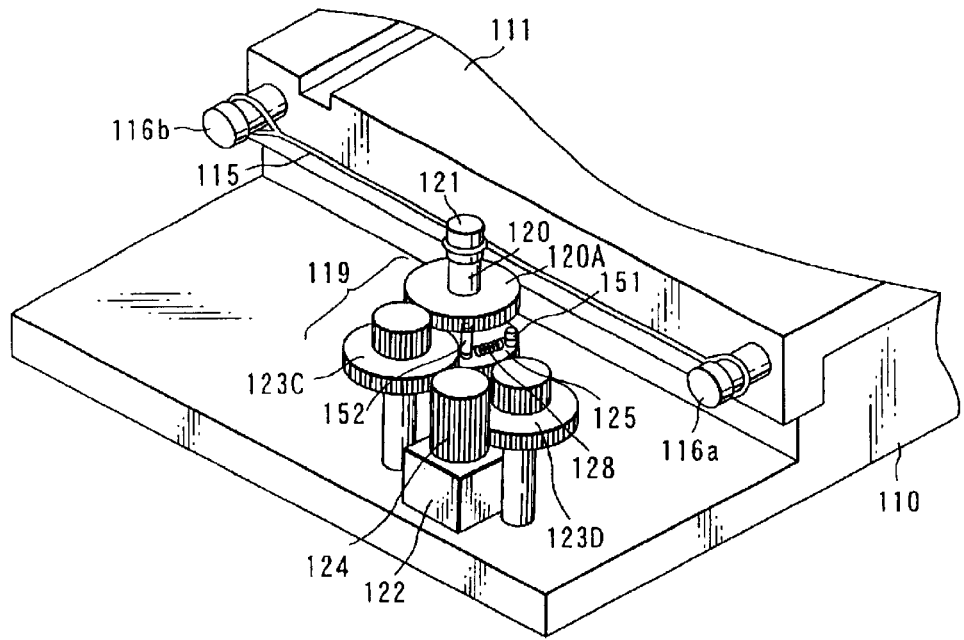
FIG. 20 is a perspective view of an electromotive stage according to a seventh embodiment.
Figure 21:
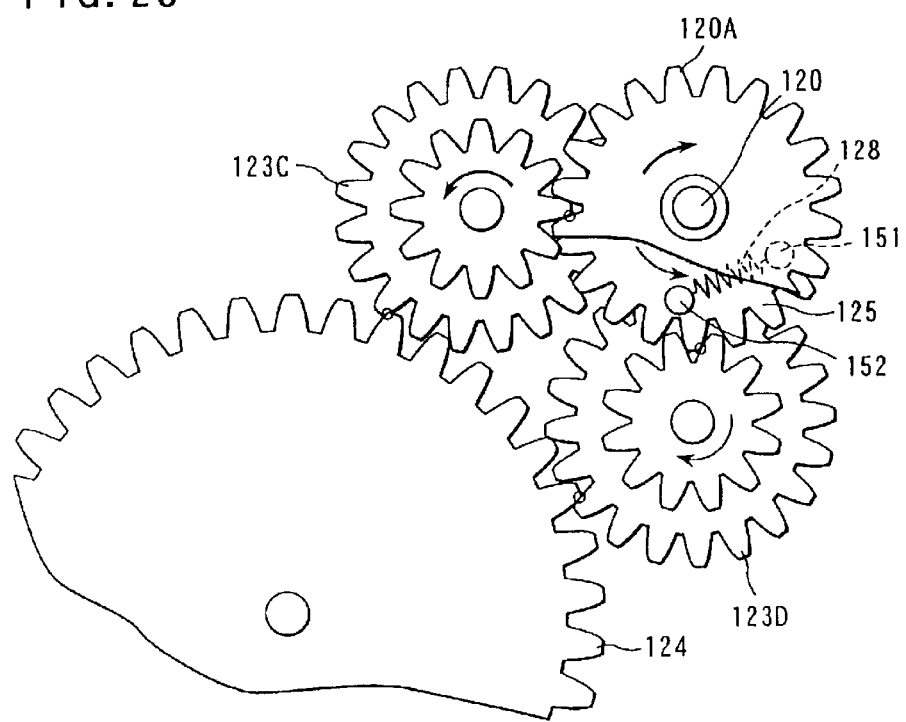
FIG. 21 is an explanatory view of a backlash removing means of the stage according to the seventh embodiment.

A seventh embodiment of the electromotive stage for the microscope will be described with reference to FIGS. 20 and 21. FIG. 20 is a perspective view of the electromotive stage for the microscope, and FIG. 21 is an explanatory view of the backlash removing means. The seventh embodiment is different from the sixth embodiment only in the backlash removing means. Since the other constituting elements are the same as those of the sixth embodiment, only the different constituting elements will be described, and the drawing and description of the same constituting elements are omitted.

In FIGS. 20 and 21, an output gear 120A is a spur gear. The output gear 120A is disposed on an upper portion of a reducer output shaft 120 of a reducer 119. An urging gear 125 equal to the output gear 120A in the module and teeth number is rotatably disposed on the lower portion of the output shaft. An elastic member, that is, a tensile spring 128 is extended between a pin 151 vertically disposed on the lower surface of the output gear 120A and a pin 152 disposed on the upper surface of the urging gear 125. A reduction gear 123C is disposed between the motor gear 124 of the stepping motor 122 and the output gear 120A so as to mesh with both the gears. A reduction gear 123D is disposed between the motor gear 124 and urging gear 125 so as to mesh with both the gears. The urging gear 125, pins 151, 152, and tensile spring 128 constitute the urging unit. Since the constitutions of the reduction gears 123C, 123D are similar to those of the reduction gears 123A, 123B in the sixth embodiment, the description is omitted.

Since the tensile spring 128 expands more than the free length, the output gear 120A and reduction gear 123C rotate in a bold arrow direction, and the urging gear 125 and reduction gear 123D rotate in a thin arrow direction. Thereby, since the tooth of the reduction gear 123C constantly abut on the tooth of the motor gear 124 in one direction, the backlash of the gear is removed, and the lost motion is reduced. In the seventh embodiment, the reducer 119 includes one set of reduction gears, but even with the use of a plurality of sets of reduction gears in order to obtain a larger reduction ratio, the similar action and effect is obtained.

According to the seventh embodiment, since the tensile spring is extended only in one position, a time required for assembling the reducer 119 is short. Moreover, the effect similar to that of the sixth embodiment is obtained.

(Eighth Embodiment)

Figure 22:
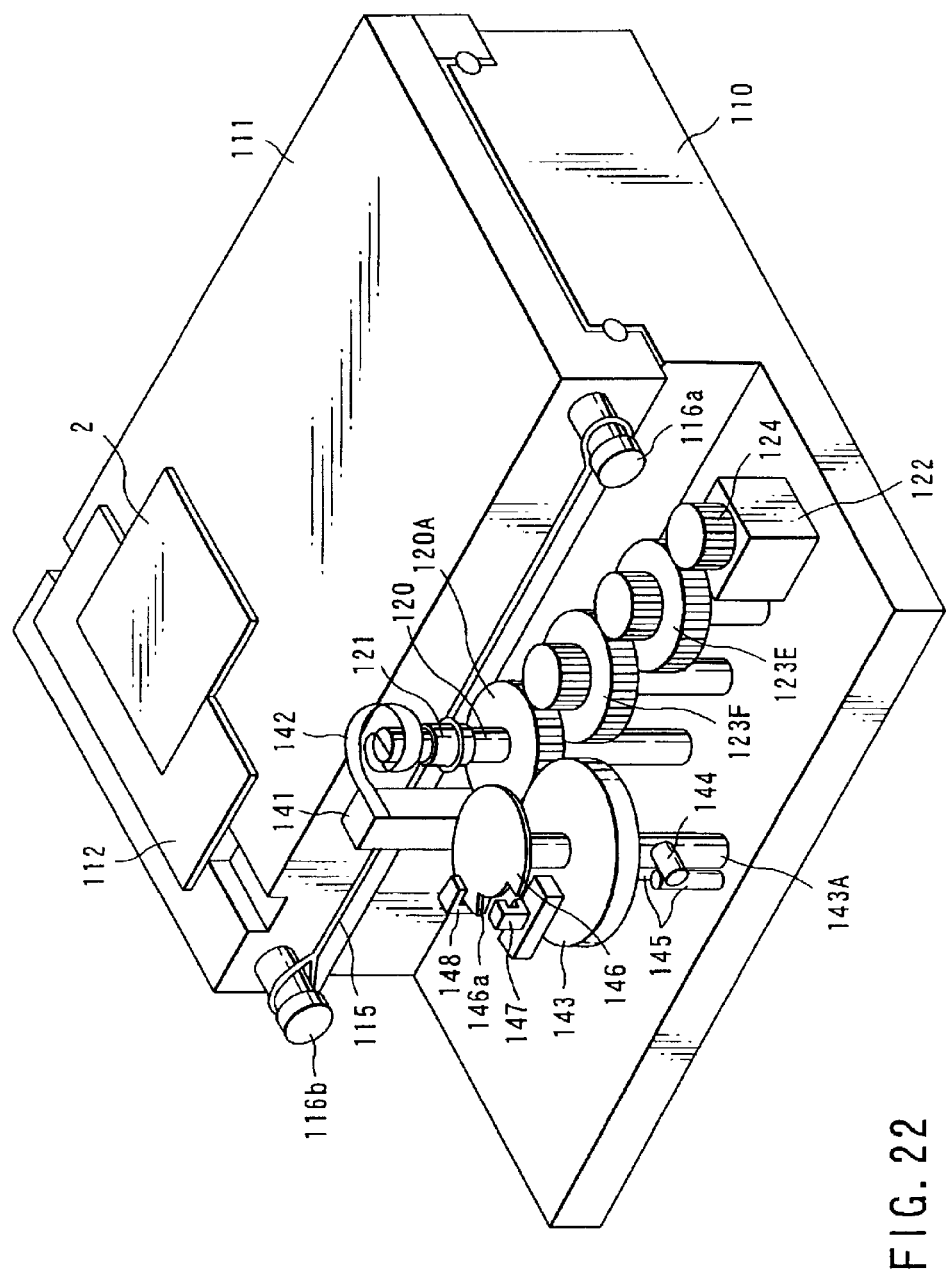
FIG. 22 is a perspective view of an electromotive stage according to an eighth embodiment.
Figure 23:
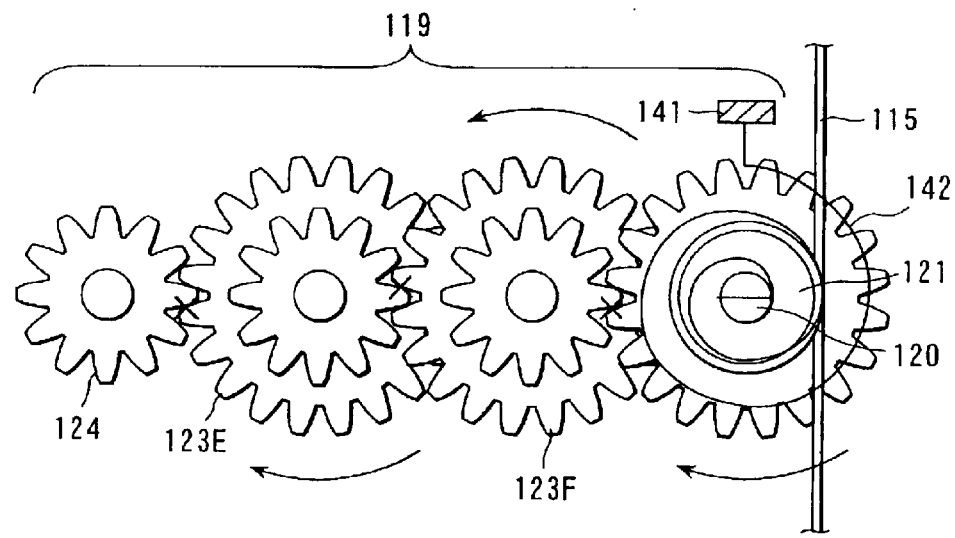
FIG. 23 is an explanatory view of a backlash removing means of the stage according to the eighth embodiment.
Figure 24:
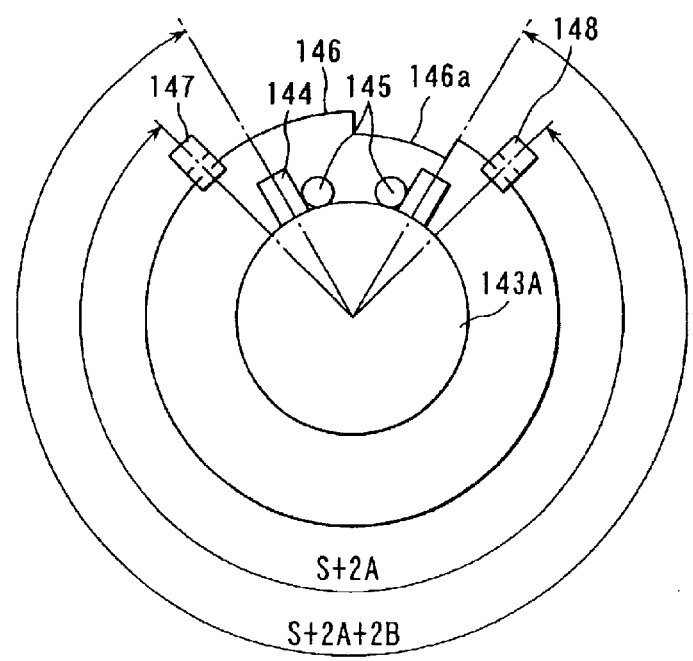
FIG. 24 is a detailed explanatory view of a spiral spring regulation shaft of the stage according to the eighth embodiment.
Figure 25:
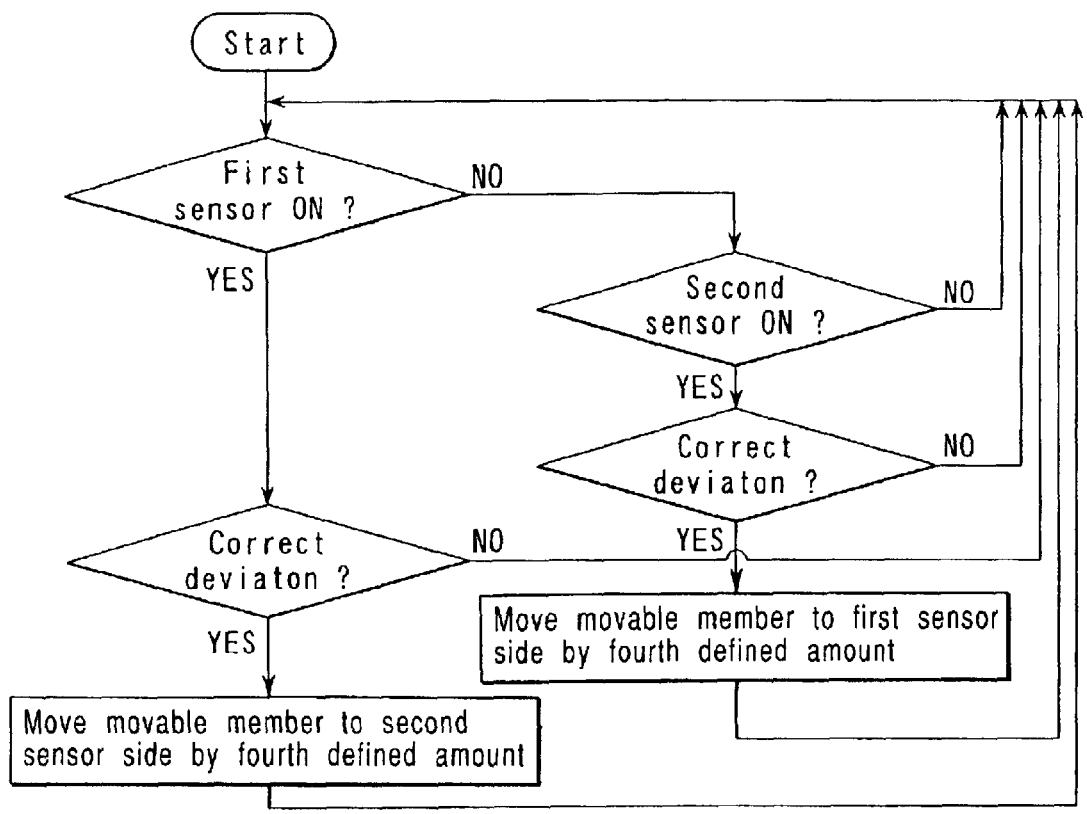
FIG. 25 is a control flowchart for correcting an operation range of the spiral spring of the stage according to the eighth embodiment.
Figure 26:
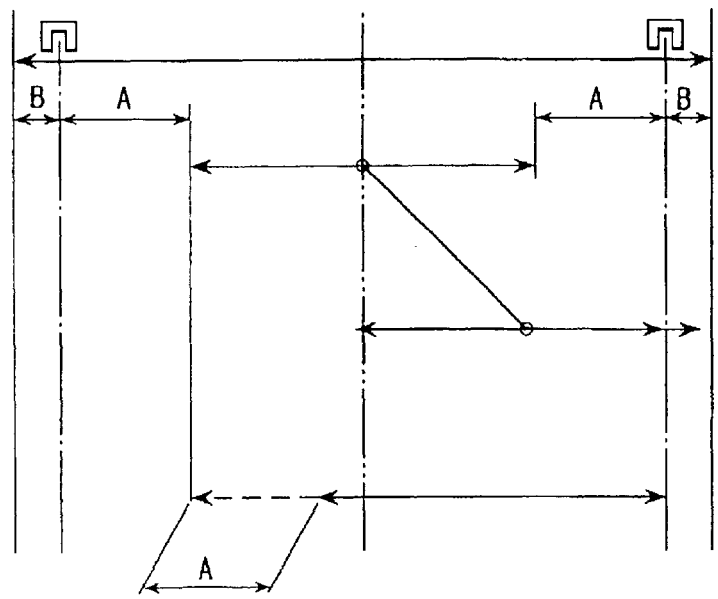
FIG. 26 is an operation explanatory view for correcting the operation range of the spiral spring of the stage according to the eighth embodiment.
Figure 27:
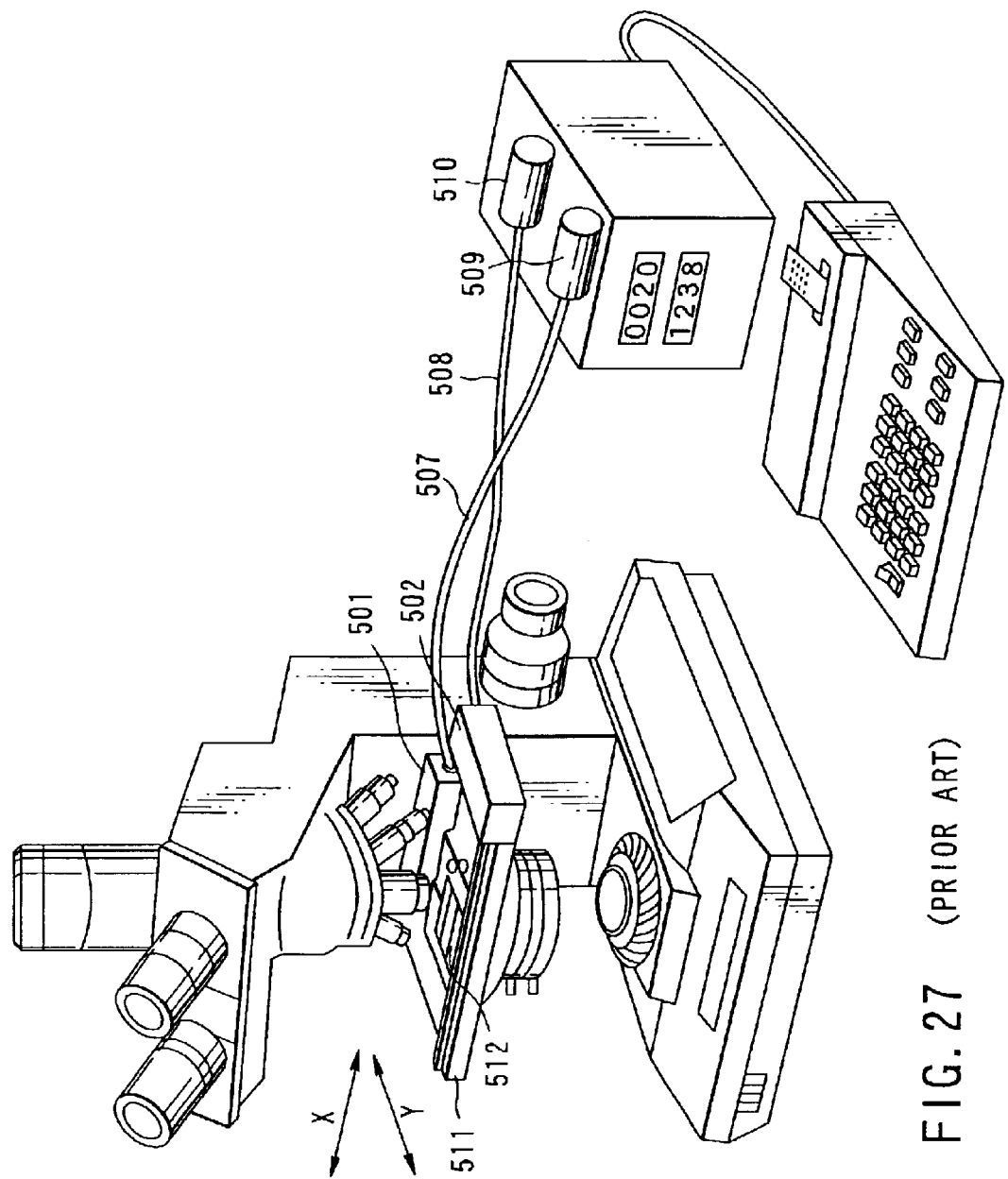
FIG. 27 is a perspective view of a microscope with an automatic sweeping apparatus according to a first conventional example.
Figure 28:
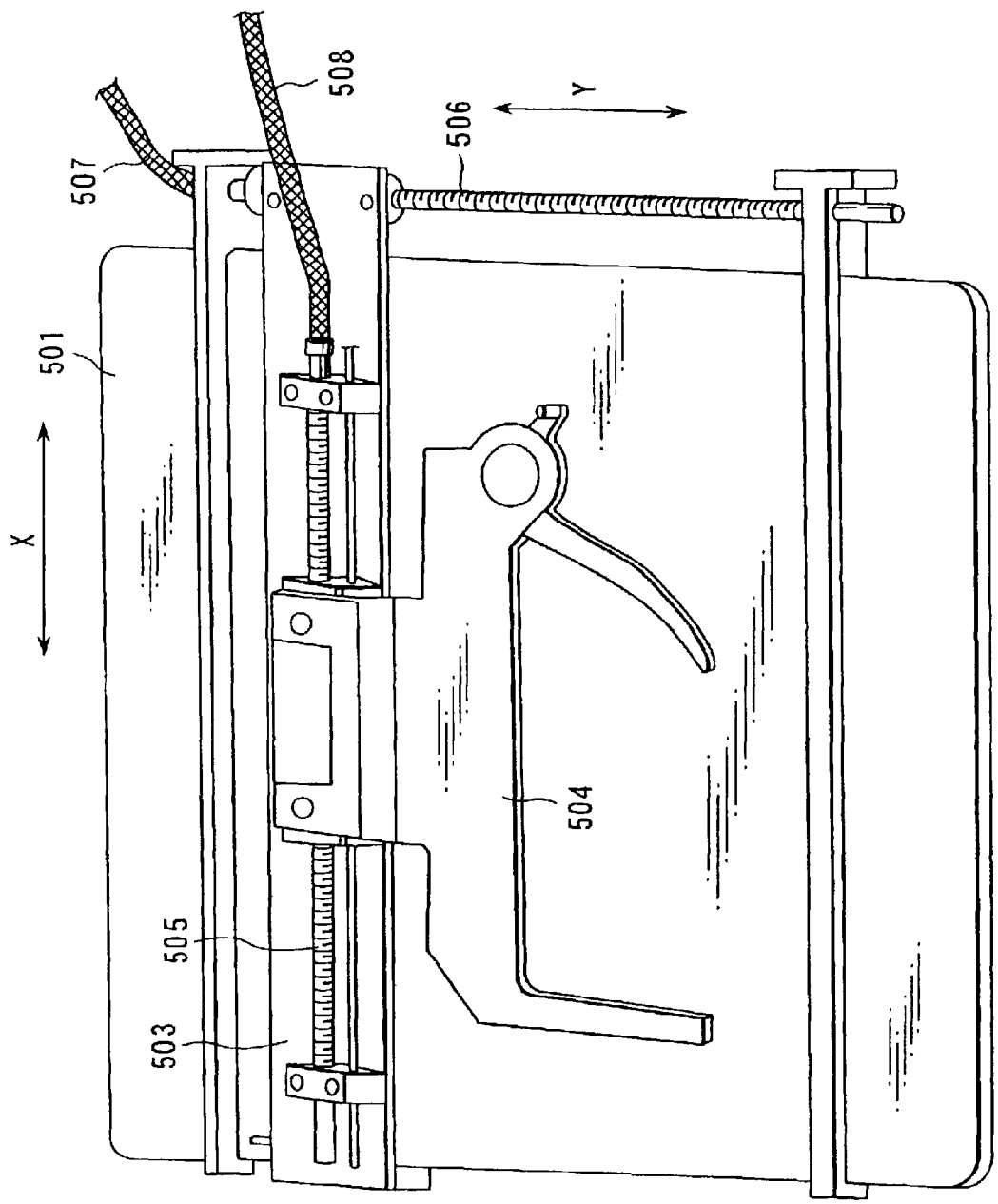
FIG. 28 is a perspective view of an electromotive stage according to the first conventional example.
Figure 29:
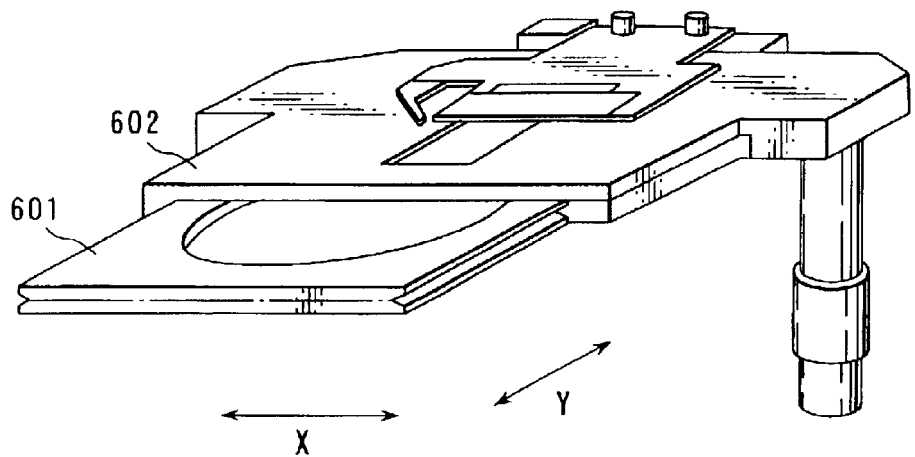
FIG. 29 is a perspective view of a stage for a microscope according to a third conventional example.
Figure 30:
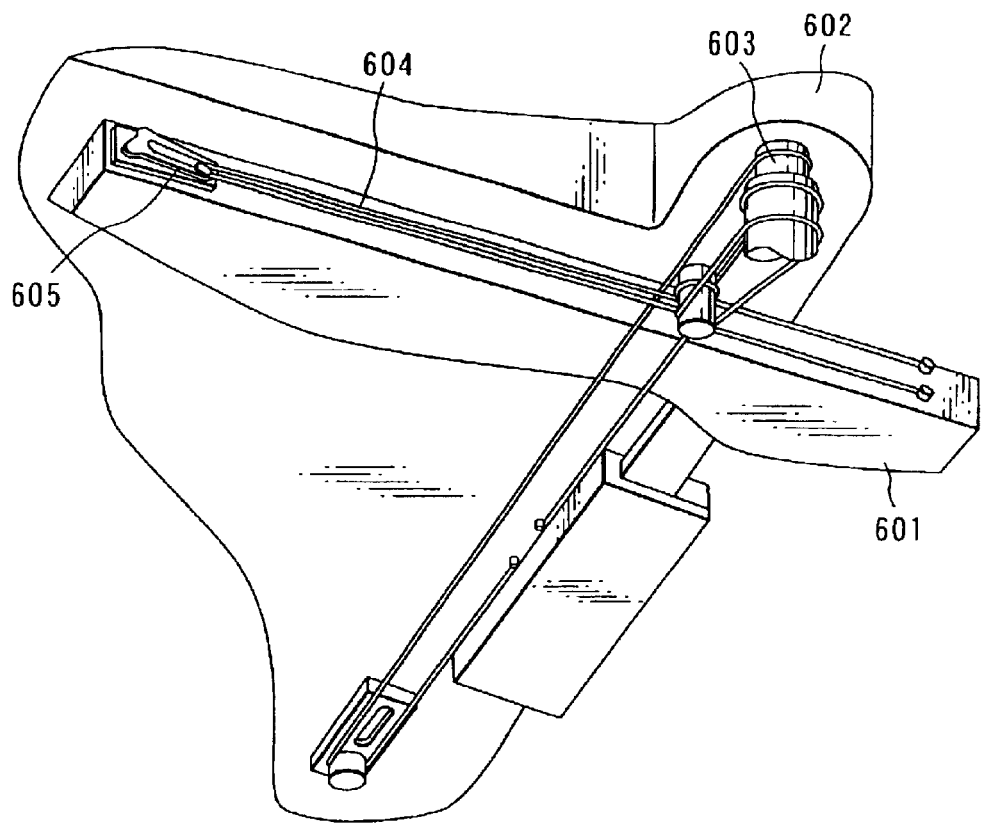
FIG. 30 is a schematic view showing a transmission mechanism of a straight member of the third conventional example.

An eighth embodiment of the electromotive stage for the microscope will be described with reference to FIGS. 22 to 26. FIG. 22 is a perspective view of the electromotive stage for the microscope, FIG. 23 is an explanatory view of the backlash removing means, FIG. 24 is a detailed explanatory view of a spiral spring regulation shaft, FIG. 25 is a control flowchart for correcting the operation range of the spiral spring, and FIG. 26 is an operation explanatory view for correcting the operation range of the spiral spring. The eighth embodiment is different from the sixth embodiment only in the backlash removing means of the reducer, and matching control of the operation range of the spiral spring and the movement range of the movable member. Since the other constituting elements are the same as those of the sixth embodiment, only the different constituting elements will be described, and the drawing and description of the same constituting elements are omitted.

In FIG. 22, a spiral spring 142 with the rotation force is disposed between a reducer output shaft 120 and a spring support 141 disposed on the stationary member 110. The reducer output shaft 120, spring support 141, and spiral spring 142 constitute the urging unit. The action of the spiral spring 142 will be described with reference to FIG. 23. In the stepping motor 122, the force keeping the position even in the non-excited state, or the detent torque acts. For example, when the detent torque of the stepping motor 122 is set to 0.05 N·m, and the torque of the spiral spring 142 is 32 N·m or less, the gear meshing with the motor gear 124 is pressed onto the motor gear 124 without rotating the stepping motor 122. As a result, the backlash between the gears is removed.

The urging force of the spiral spring 142 rotates the respective gears in the predetermined directions. Three x marks of FIG. 23 indicate the contacts of the meshing gears, and arrows indicate the rotation directions of the gears. The urging force of the spiral spring 142 is set to a value smaller than the above-described value in consideration of the torque of the stepping motor 122 during the driving.

When the electromotive stage for the microscope according to the eighth embodiment is used, the lost motion is reduced. The wire rope 115 is a power transmission element using the friction force. When the overload occurs, the slip occurs between the wire rope 115 and the driving pulley 121. For example, when the foreign matter is caught between the movable member 111 and stationary member 110, the slip occurs, the driving force of the stepping motor 122 is not transmitted to the movable member 111, and the electromotive stage and the caught foreign matter can be prevented from being damaged.

However, when the slip is generated, the deviation is generated in the operation range of the spiral spring 142 and the movement range of the movable member 111. When an urging force is generated by the spiral spring 142, the operation range of the spiral spring 142 needs to be limited. When the range is not limited, the urging force of the spiral spring 142 comes short, or the spiral spring 142 is damaged.

The constitutions for limiting the operation range of the spiral spring 142, and correcting the deviations of the movement range of the movable member 111 and the operation range of the spiral spring 142 will be described. A regulation gear 143 which meshes with the output gear 120A is rotatably disposed on the stationary member 110. A regulation pin 144 projects from an output shaft 143A of the regulation gear 143 in a direction perpendicular to the rotation shaft. Two regulation pins 145 are positioned on the stationary member 110 so as to abut on the regulation pin 144. A shield disc 146 having a cutout 146a in the peripheral edge thereof is attached to the output shaft 143A. FIG. 24 shows a relation of the regulation pins 144, regulation pins 145, and shield disc 146. The center of a movement range S of the movable member 111 (see FIG. 22) coincides with the center of the operation rang of the spiral spring 142. A first sensor 147 and second sensor 148 are disposed in positions apart from the opposite ends of the movement range S of the movable member 111 by distances A. The regulation pins 145 abut on two regulation pins 144 in positions apart from the positions of the first sensor 147 and second sensor 148 by distances B. That is, (S+2A+2B) is the operation range of the spiral spring 142 (see FIG. 22).

A flow of the deviation correction controls of the operation range of the spiral spring 142 and the movement range of the movable member 111 will be described hereinafter. As shown in FIGS. 24, 25, and 26, when the first sensor 147 or the second sensor 148 detects the cutout 146a of the shield disc 146, the position of the movable member 111 is apart from the operation range end of the spiral spring 142 by B. When the movable member 111 is moved from this position against the urging force of the spiral spring 142, the position of the movable member 111 reaches the operation range end of the spiral spring 142. In this case, the movable member 111 cannot be moved any more. It is confirmed with an operator whether or not to perform the deviation correction, before the position of the movable member 111 reaches the operation range end of the spiral spring 142. When the deviation correction is performed, the movable member 111 is moved by a fourth defined amount K4 in a direction opposite to the first sensor 147 or second sensor 148 which detected the cutout. Here, the fourth defined amount K4 is defined in the following equation.

$$K4=(A-2B+S)/2$$

S: Movement range of the movable member 111
A=Operation range of the spiral spring 142 determined by the regulation pins 144 and 145
B: Allowance value The fourth defined amount K4 means that the operation position of the spiral spring 142 is moved to an opposite side by (the movement range S of the movable member 111+A). Since the movement amount is not less than the movement range of the movable member 111, the movable member 111 is disposed in the movement end on the opposite side of the sensor which detected the cutout. That is, the center of the operation range of the spiral spring 142 coincides with the center of the movement range S of the movable member 111.

According to the eighth embodiment, only the spiral spring disposed on the output shaft can remove the backlashes of all the gears. After the gears are assembled into the reducer, the spiral spring is attached. Therefore, an operation of dislocating and overlapping the teeth of two gears as described in the seventh embodiment is unnecessary. Therefore, it is easier to assemble and adjust the reducer than in the seventh embodiment. Moreover, the effect similar to that of the sixth embodiment is obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An electromotive stage for a microscope, comprising:

a stationary member adapted to be fixed to the microscope;

a movable member which holds a sample and which is movable in a direction perpendicular to an optical axis of the microscope;

a stepping motor which moves the movable member;

a power transmitter which transmits a rotation of the stepping motor to the movable member;

an origin detector which detects whether the movable member is positioned at an origin;

a control unit which controls a position of the movable member based on a signal from the origin detector and a number of driving pulses of the stepping motor;

a reducer which reduces a speed of the transmitted rotation of the stepping motor and includes at least one spur gear, and which is fixed to the stationary member such that the power transmitter is provided with the reducer;

a pulley attached to an output shaft of the reducer;

a wire rope which is wound around the pulley such that opposite ends of the wire rope are attached to the movable member; and an urging unit which applies a rotation force to the spur gear in one direction in a movement range of the movable member;

wherein the power transmitter is provided with the urging unit; and wherein the urging unit includes a spiral spring which is disposed between the output shaft of the reducer and the stationary member and which applies an urging force to the output shaft of the reducer.

2. An electromotive stage for a microscope, comprising:

a stationary member adapted to be fixed to the microscope;

a movable member which holds a sample and which is movable in a direction perpendicular to an optical axis of the microscope;

a stepping motor which moves the movable member;

a power transmitter which transmits a rotation of the stepping motor to the movable member;

an origin detector which detects whether the movable member is positioned at an origin;

a control unit which controls a position of the movable member based on a signal from the origin detector and a number of driving pulses of the stepping motor;

a reducer which reduces a speed of the transmitted rotation of the stepping motor and includes at least one spur gear, and which is fixed to the stationary member such that the power transmitter is provided with the reducer;

a pulley attached to an output shaft of the reducer;

a wire rope which is wound around the pulley such that opposite ends of the wire rope are attached to the movable member; and an urging unit which applies a rotation force to the spur gear in one direction in a movement range of the movable member;

wherein the reducer includes at least two spur gears which mesh with each other;

wherein the power transmitter is provided with the urging unit;

wherein the urging unit comprises an urging gear which rotates around a rotation shaft of a first spur gear and meshes with a second spur gear, and an elastic member which applies an urging force to the first spur gear and the urging gear so that the first spur gear and the urging gear rotate in opposite directions; and wherein a tooth of the second spur gear is held between a tooth of the first spur gear and a tooth of the urging gear, and the tooth of the first spur gear is pressed onto the tooth of the second spur gear in one direction by the urging force.

* * * * *